(12) United States Patent
Tobiason et al.

(10) Patent No.: US 6,905,258 B2
(45) Date of Patent: Jun. 14, 2005

(54) MINIATURE IMAGING ENCODER READHEAD USING FIBER OPTIC RECEIVER CHANNELS

(75) Inventors: Joseph D. Tobiason, Woodinville, WA (US); Michael Nahum, Kirkland, WA (US); Kim W. Atherton, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/650,453

(22) Filed: Aug. 27, 2003

(65) Prior Publication Data

US 2005/0047728 A1 Mar. 3, 2005

(51) Int. Cl.⁷ .................................................. G02B 6/36
(52) U.S. Cl. ............................ 385/89; 385/53; 385/88
(58) Field of Search ............................... 385/88, 89, 90

(56) References Cited

U.S. PATENT DOCUMENTS

| | | | | |
|---|---|---|---|---|
| 3,902,063 A | * | 8/1975 | Oelsch et al. | 250/233 |
| 4,291,976 A | | 9/1981 | McMahon | |
| 4,604,725 A | | 8/1986 | Davies et al. | |
| 4,733,071 A | | 3/1988 | Tokunaga | |
| 4,780,600 A | | 10/1988 | Johnston | |
| 4,981,335 A | * | 1/1991 | Gaebe | 385/33 |
| 5,453,838 A | | 9/1995 | Danielian et al. | |
| 5,566,259 A | * | 10/1996 | Pan et al. | 385/11 |
| 5,576,537 A | | 11/1996 | Holzapfel et al. | |
| 5,621,527 A | * | 4/1997 | Kaneda et al. | 356/499 |
| 5,808,730 A | | 9/1998 | Danielian et al. | |
| 5,909,283 A | | 6/1999 | Eselun | |
| 6,014,244 A | | 1/2000 | Chang | |
| 2004/0011948 A1 | | 1/2004 | Tobiason | |

FOREIGN PATENT DOCUMENTS

| | | |
|---|---|---|
| EP | 1 382 941 A1 | 1/2004 |
| GB | 2 185 359 A | 7/1987 |
| JP | 59173713 | 10/1984 |
| JP | 1272917 | 10/1989 |

OTHER PUBLICATIONS

"How Do I Make a Telecentric System?" *Light Ideas* Issue #2, ©1997 Light Works, <http://www.1w4u.com/LightId002.html> [retrieved Apr. 7, 2003], 4 pages.

Kane, J., "Telecentric Lenses: What You Need to Know," *Computer Optics Inc.*, at least as early as 1996, <http://www.computeroptics.com/telecentric.html> [retrieved Apr. 7, 2003], 4 pages.

Pedrotti, L.S., "D. Lens Formulas for Thin Lenses," *Module 1.3 Basic Geometrical Optics (E–III–4)*, <http://cord.org/step_online/st1–3/st13eiii4.htm [retreived Mar. 6, 2004], 4 pages.

* cited by examiner

Primary Examiner—Phan T. H. Palmer
Assistant Examiner—Jennifer Doan
(74) Attorney, Agent, or Firm—Christensen O'Connor Johnson Kindness PLLC

(57) ABSTRACT

A fiber optic readhead arrangement for imaging a scale onto a set of optical fiber receiver channels is disclosed. The readhead arrangement includes an imaging lens and may include an aperture positioned at a focal point of the imaging lens in a telecentric arrangement. An axicon lens may be utilized to direct source light away from the imaging lens and into a ring-shaped annular source lens which surrounds the imaging lens. A source lens may concentrate source light on the scale in an area where it will be imaged back through the imaging lens to the readhead. In one embodiment, multiple source fibers may be provided around the perimeter of the fiber optic readhead arrangement. In another embodiment, the receiver fibers may also function as source fibers. In various exemplary embodiments, high levels of displacement signal interpolation may be achieved to provide high resolution measurement.

45 Claims, 8 Drawing Sheets

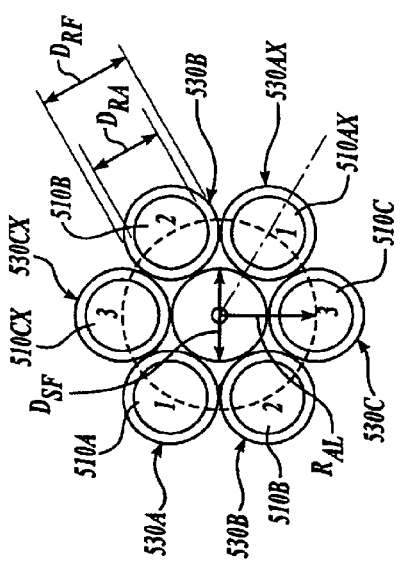
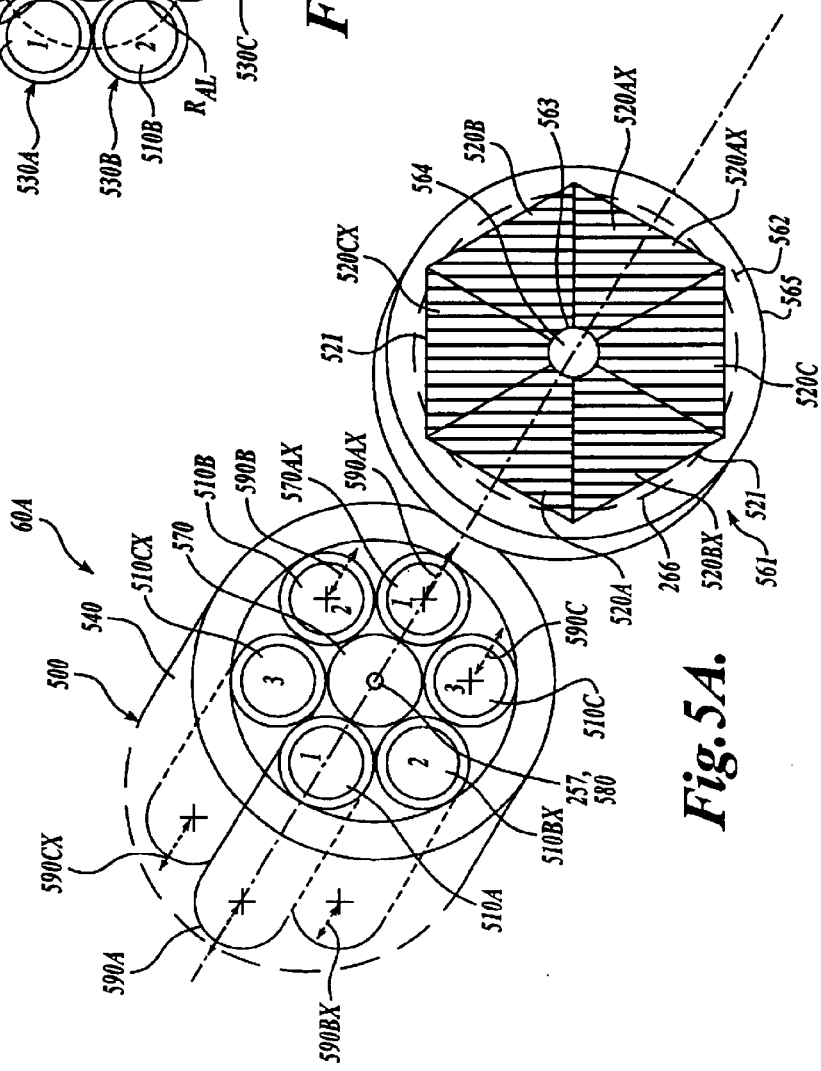
*Fig.5B.*
*Fig.5A.*

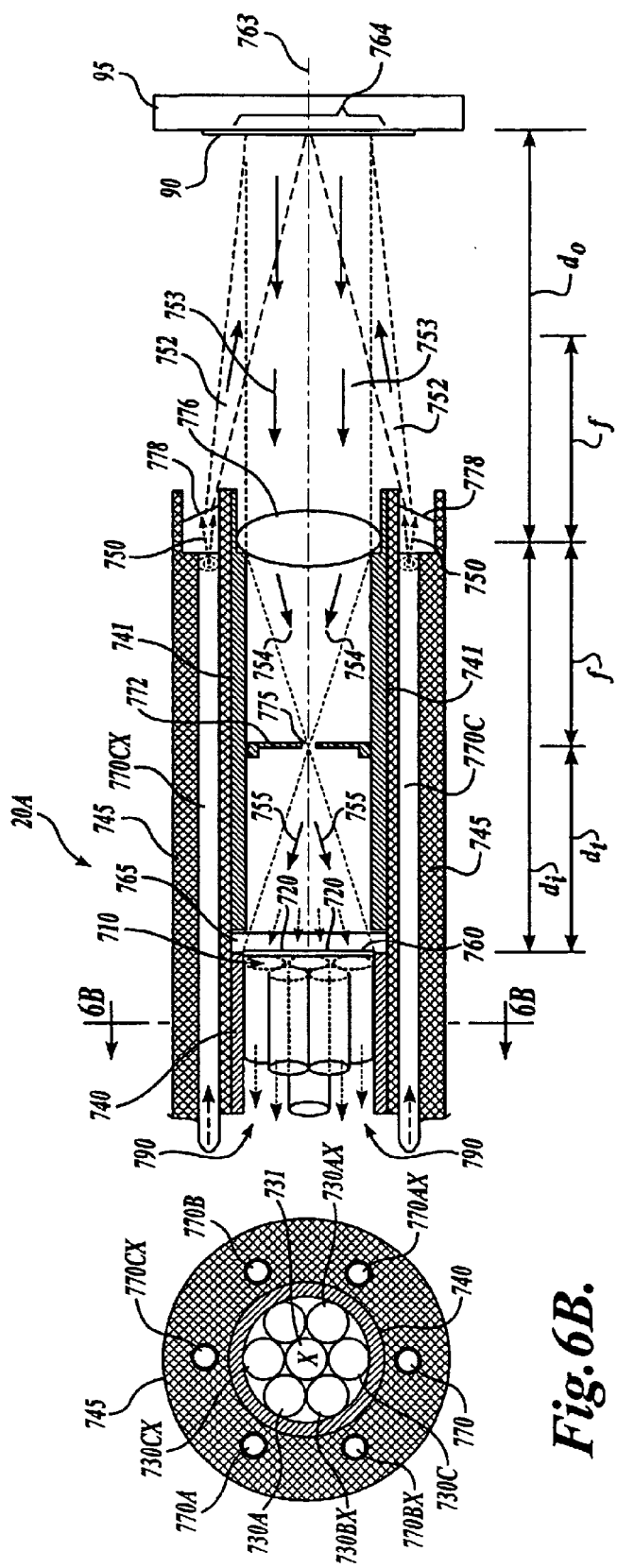

MINIATURE IMAGING ENCODER READHEAD USING FIBER OPTIC RECEIVER CHANNELS

FIELD OF THE INVENTION

This invention relates generally to displacement sensing optical encoders, and more particularly to an optical encoder including a miniature readhead that images a scale onto a set of optical fiber receiver channels in the readhead so as to provide an ultra-compact imaging encoder system.

BACKGROUND OF THE INVENTION

Various movement or position encoders for sensing linear, rotary or angular movement are currently available. These encoders are generally based on either optical systems, magnetic scales, inductive transducers, or capacitive transducers. Certain of these encoders are designed for making relative measurements. In such relative displacement or position encoders, measurements are typically made by sensing the relative change in position of the scales with respect to a reference position, which requires a sensing of the change in the scale pattern so that repetitions of the pattern can be counted. This type of position measurement may be referred to as incremental displacement measurement or incremental position sensing or measurement.

For optical encoders, a number of incremental position systems have been developed. One recent system utilizing fewer parts than most previous systems is disclosed in U.S. Pat. No. 5,909,283, to Eselun. The system described in the '283 patent has a grating scale and readhead including a point source (laser diode in readhead), a Ronchi grating or holographic element, and a photodetector array. As described, the point source results in interference fringes having a spacing equal to that of the scale. The interference fringe light is transmitted through the Ronchi grating or holographic element to the photodetector array. The photodetector array is arranged to derive four channels of quadrature signals from the transmitted fringe light. One drawback of the system described in the '283 patent is that the resulting encoder is of a size that is relatively large or prohibitive for a number of applications. Furthermore, in some modern motion control systems which have optical readheads that use electronic photodetectors, as disclosed in the '283 patent, attenuation of high frequency measurement signals that are detected and transmitted over relatively long wire lengths is becoming a limiting factor.

Another type of optical encoder is disclosed in U.S. Pat. No. 4,733,071, to Tokunaga. The system described in the '071 patent has a code member scale, and an optical sensor head comprising an optical fiber tip light emitter and two optical fiber tip receptors closely arranged along the code member measuring axis. The optical sensor head is rotated (yawed) to adjust phase difference between the two optical fiber tip receptors. However, the accuracy of the resulting encoder is relatively crude.

A position sensing device that can overcome the foregoing problems and limitations, individually or in combination, is desirable.

SUMMARY OF THE INVENTION

The present invention is directed to providing an encoder that overcomes the foregoing and other disadvantages. More specifically, the present invention is directed to an imaging encoder system which provides a miniature readhead that images a scale onto a set of optical fiber receiver channels in the readhead, that provides very high resolution measurements, and which is of extremely small size, in addition to having a number of other desirable features.

A fiber optic readhead arrangement for sensing the displacement of a scale is disclosed. In one embodiment, the scale may comprise a pattern of reflective portions. The readhead senses displacement of the scale in a selected direction according to the pattern of reflective portions. The readhead includes a light source for transmitting light through an optical assembly to the scale, and detector channels for receiving light that is returned from the scale through the optical assembly. In accordance with one aspect of the invention, the detector channels of the encoder readhead are fiber optic detector channels.

As previously outlined, electronic readhead receivers (photodetectors) such as disclosed in the '283 patent suffer limitations in converting the high frequency detector signals associated with high speed scale motion and transmitting those signals over long cables without significant signal loss or interference. In addition, electronic photodetectors and the associated circuit connections contribute to readheads that are too large for many potential encoder applications. It will be appreciated that the fiber optic detector channels of the present invention overcome these limitations.

In accordance with another aspect of the invention, in one embodiment the optical assembly is configured as a telecentric system. Such telecentric systems generally include a limiting aperture plate that is placed at the focal point of an imaging lens. Accordingly, the limiting aperture allows only light rays that are approximately parallel to the optical axis of the lens and aperture to pass. A key advantage of such a telecentric system is that it provides a magnification for the operable scale images in the readhead that is approximately independent of the distance between the readhead and the scale. Within its depth of field, the telecentric imaging system will generally show little or no magnification error. Such embodiments thus provide high accuracy and resolution in combination with providing robust mounting tolerances.

In accordance with another aspect of the invention, in addition to the imaging lens and the limiting aperture, in one embodiment the optical assembly also includes an axicon lens, at least one optical baffle, and an annular source lens. A source light that is provided by the readhead is directed away from the imaging lens by the axicon lens and into the ring-shaped annular source lens which surrounds the imaging lens. The annular source lens concentrates the light on the scale in the area where it will be imaged back through the imaging lens to the readhead. The at least one optical baffle reduces or eliminates unwanted light that might reach the fiber optic detector channels of the readhead in the absence of the at least one optical baffle.

In accordance with another aspect of the invention, in one embodiment the optical assembly includes an imaging lens, but is made more compact and less complex by not including the conical lens, the optical baffle, the aperture, or the annular source lens. However, one of the tradeoffs is that this fiber optic readhead arrangement is generally not telecentric, and is thus more sensitive to mounting and misalignment variations.

In accordance with another aspect of the invention, in one embodiment one or more of the receiver fibers of the readhead may also function as a source fiber. In general, the detected light is separated from the source light by a beam splitter, polarizer, or other such light separating means. In another embodiment, a fiber circulator may be utilized for this purpose.

In accordance with another aspect of the invention, in one embodiment the source light may be provided by a plurality of source fibers spaced away from the center of an axi-symmetric close-packed fiber arrangement rather than a single source fiber in the middle of the receiver fibers. In such embodiments, a dummy fiber may be provided in the middle of the axi-symmetric close-packed fiber arrangement so as to conveniently provide proper spacing of the surrounding fibers. In one embodiment, the receiver fibers are built into a first ferrule that is centrally located in the readhead. The source fibers are then generally arranged around the outside of the first ferrule and secured within a second ferrule that surrounds the readhead. The first ferrule may support the phase mask, while the second ferrule supports the source lens or lenses that are placed in front of each of the source fibers. In one embodiment, the source fibers have a large numerical aperture (NA) in order to get a good distribution of light across the scale.

In accordance with another aspect of the invention, in various exemplary embodiments the fiber optic readhead arrangement includes fiber optic detector channels for receiving light from the scale. The fiber optic detector channels of the present invention may be contrasted with electronic readhead receivers (photodetectors) such as those disclosed in the '283 patent. In general, electronic readhead receivers (photodetectors) suffer limitations in converting the high frequency detector signals associated with high speed scale motion and transmitting those signals over long cables without significant signal loss or interference. In addition, electronic photodetectors and their associated circuit connections contribute to readheads that are too large for many potential encoder applications. It will be appreciated that the fiber optic detector channels of the present invention overcome these limitations.

In accordance with another aspect of the invention, the fiber optic readhead arrangement includes multiple fiber optic detector channels that each have respective phase masks. The respective phase masks of at least two of the fiber optic detector channels have different spatial phases with respect to each other and with respect to the scale grating or pattern. Conventional optical fiber tip receptors such as those disclosed in the '071 patent are relatively crude. In general, they have insufficient spatial resolution for fine phase signal discrimination if they have a large diameter, and gather too little light to provide a good signal if they have a small diameter. In addition, it is difficult to assemble conventional optical fiber tip receptors so that they have the proper spatial phase relationship relative to one another. Thus, their resolution is limited individually and their overall accuracy is limited in combination. It will be appreciated that the arrangement of fiber optic detector channels and respective phase masks of the present invention overcome these and other limitations to provide high resolution and accuracy.

In accordance with another aspect of the invention, the scale grating or pattern images detected by the fiber optic detector channels are images that have a depth of focus that provides for relatively robust alignment tolerances and high resolution.

In accordance with a separate aspect of the invention, the fiber optic detector channels of the readhead are arranged in balanced pairs, to provide enhanced accuracy.

In accordance with a further aspect of the invention, 3 balanced pairs of fiber optic detector channels within the readhead are signal processed in a manner that provides enhanced accuracy.

In accordance with a separate aspect of the invention, the light source for the readhead is provided by an optical fiber, to provide an all-optical readhead, free of all limitations and costs associated with electronic assembly and electronic signals in an encoder readhead.

In accordance with a separate aspect of the invention, the various optical fibers of the fiber optic encoder are selected from various types such that the encoder measurement accuracy is relatively unaffected by bending of the fiber optic readhead cable.

In accordance with a separate aspect of the invention, various embodiments of the fiber optic encoder readhead are constructed in a particularly economical, accurate and compact manner.

In accordance with a separate aspect of the invention, the fiber optic encoder readhead is constructed such that it may be inserted into a standard commercially available fiber optic connector configuration.

In accordance with a separate aspect of the invention, a light deflecting element is provided to deflect the light path between the optical assembly and the scale, such that the operable mounting orientation of the optical assembly relative to the scale is changed.

In accordance with a separate aspect of the invention, in one embodiment a remote interface box is utilized that contains appropriate electronic light sources and photodetectors that interface with the fiber optics to and from the readhead according to this invention, and converts received optical signals to a form suitable for further signal processing and readhead position determination.

Hence, the invention overcomes the disadvantages of prior art optical displacement sensing devices and provides new application possibilities with a system that can provide measurements at extremely high speeds and that is ultra-compact, highly accurate, and economical.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 5A and 5B are partially exploded isometric views of the fiber and mask arrangement of a second generic embodiment of a fiber optic readhead usable according to this invention;

FIGS. 6A and 6B are end and side views of a second generic embodiment of a fiber optic readhead arrangement according to this invention;

DETAILED DESCRIPTION OF THE PREFERRED EMBODIMENT

Figure 1:
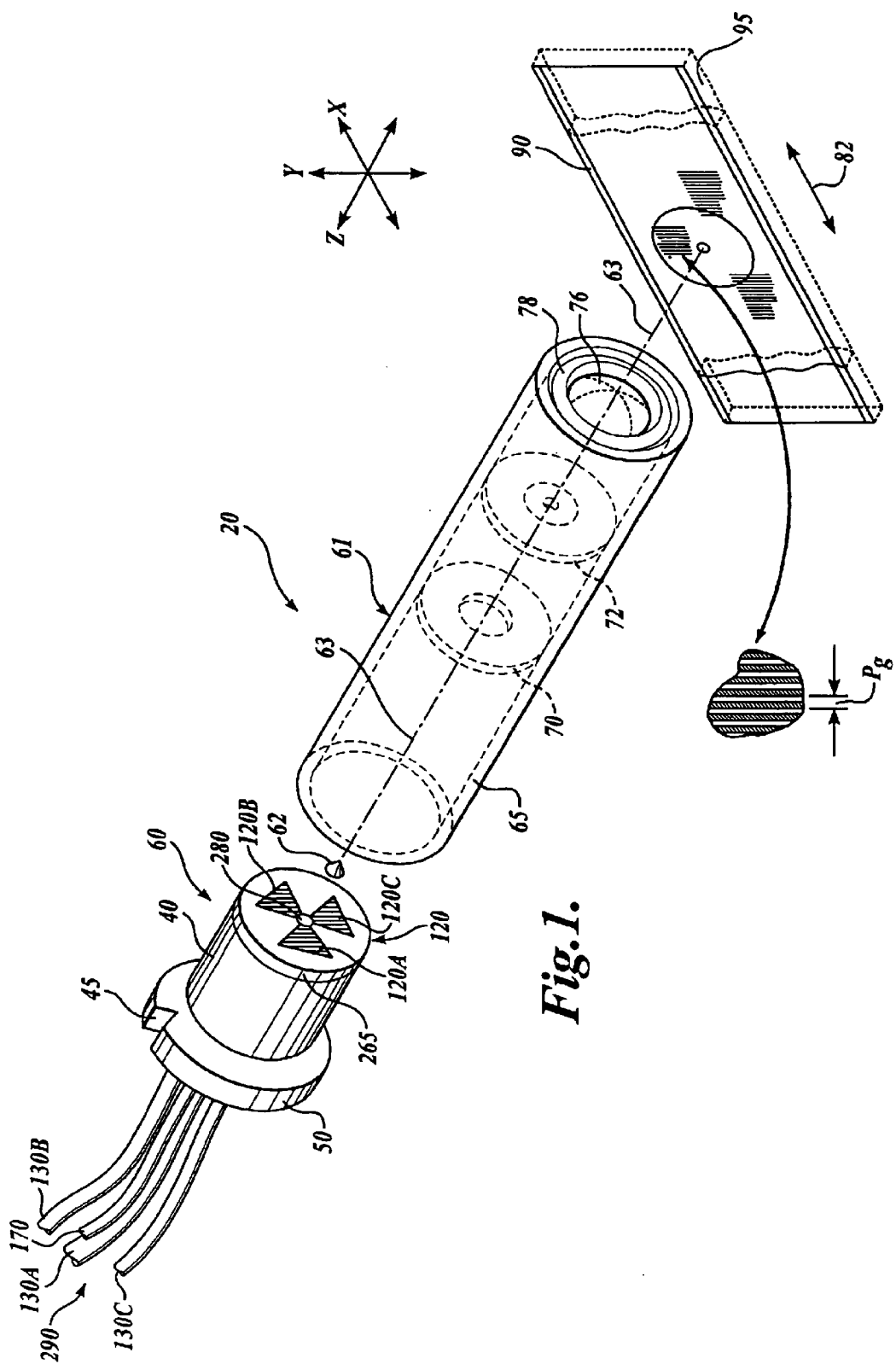
FIG. 1 is an isometric view of a first generic embodiment of a fiber optic readhead arrangement including a first generic embodiment of a fiber optic readhead according to this invention.

FIG. 1 shows a first generic embodiment of a fiber optic readhead arrangement 20 according to this invention. As will be described in more detail below, the fiber optic readhead arrangement 20 includes a readhead 60, an optical assembly 61, an axicon lens 62 and a scale 90. An imaging lens 76 within the optical assembly 61 is utilized to image the scale 90 onto the readhead 60. It should be understood that the scale 90 can extend to any desired dimension along the direction of the measuring axis 82. Thus, the scale 90 shown in the various figures herein can be interpreted as a segment of a much larger scale, in various exemplary embodiments according to this invention.

The readhead 60 is encased by a ferrule 40, which has a collar 50 and an alignment groove 45. The readhead 60 may be formed in accordance with the teachings of U.S. patent application Ser. No. 10/298,312, entitled "High Accuracy Miniature Grating Encoder Readhead Using Fiber Optic Receiver Channels," filed Nov. 15, 2002, which is commonly assigned and hereby incorporated by reference in its entirety.

As will be described in more detail below, the readhead 60 is coupled to a fiber optic channel set 290 that includes three receiver optical fibers 130a, 130b, and 130c, and an illumination fiber 170. The illumination fiber 170 provides light that is emitted from a light source 280 of the readhead 60. The axicon lens 62 is positioned proximate to the light source 280 to distribute the emitted source light along a desired light path, as described in greater detail below with reference to FIG. 2. In various exemplary embodiments, the source light may be white light. In various other embodiments, the source light may be monochromatic or quasi-monochromatic and have a nominal wavelength $\lambda$. More generally, the wavelength(s) $\lambda$ of the source light may include any wavelength that is usable to produce detectable images according to the principles of this invention. The readhead 60 also includes phase masks 120, including phase masks 120a, 120b, and 120c, respectively arranged over the optical receiver channel apertures provided by the ends of the receiver optical fibers 130a, 130b, and 130c, as will also be described in more detail below. In various exemplary embodiments, the phase masks 120a, 120b, and 120c of the readhead 60 are conveniently arranged in a co-planar arrangement which defines and/or coincides with a nominal receiving plane 160. With regard to considerations for producing a compact readhead 60, it should be appreciated that the receiver optical fibers 130a, 130b, and 130c are generally dimensioned and positioned in accordance with the teachings of the incorporated '312 application and/or as outlined with reference to various figures below.

As will be described in more detail below, the readhead 60 is joined to the optical assembly 61. The source light distributed through the axicon lens 62 passes through the optical assembly 61 and is emitted from an annular source lens 78 at the end of the optical assembly 61 that is positioned adjacent to the scale 90. When the scale 90 is illuminated by the source light, the source light is selectively reflected back by various features of the scale 90 to provide a reflected scale light arising from the illuminated scale 90. The scale light passes through an imaging lens 76 of the optical assembly 61 and passes through the remainder of the optical assembly 61 to be received by the readhead 60, as described in greater detail below with reference to FIG. 2. In operation, the scale 90 is positioned at a generally stable operating distance or operating gap from the optical assembly 61 along an optical axis 63. The scale 90 is arranged in a plane approximately normal to the optical axis 63 and moves relative to the optical assembly 61 along an axis of relative motion in that plane, such as a measuring axis direction 82. The operating distance and the relative motion are generally constrained, such as, for example, by conventional guideways or bearings (not shown) mounted to a frame, to maintain the proper relative position between the optical assembly 61 and the scale 90.

As shown in FIG. 1, the imaging lens 76 is positioned such that the optical axis 63 of the imaging lens 76 is generally aligned with the area of the scale 90 that is illuminated by the emitted source light In the exemplary embodiment shown in FIG. 1, the optical assembly further includes a pinhole aperture plate 72, spaced apart from the imaging lens 76 along the optical axis 63 by a distance coinciding with a focal length f (see FIG. 2) of the imaging lens 76. In addition, the receiving plane 160 of the readhead 60 is spaced apart from the aperture plate 72 along the optical axis 63 by an image distance $d_i$ (see FIG. 2). This spacing provides a telecentric optical arrangement that makes the magnification of the image of the scale 90 that is provided at the receiving plane 160 approximately independent of an object distance $d_o$ (see FIG. 2) from the imaging lens 76 to the scale 90.

As will be described in more detail below with reference to FIG. 2, the optical assembly 61 further includes an optical assembly housing 65, an optical baffle 70, and the annular source lens 78. The readhead 60 and optical assembly 61 operate to provide a focused, or approximately focused, image of the scale 90 at the receiving plane 160 of the readhead 60. As will be described in more detail below, in various exemplary embodiments, the scale 90 includes a scale grating pattern having a grating pitch $P_g$, which is formed on a substrate 95.

Figure 2:
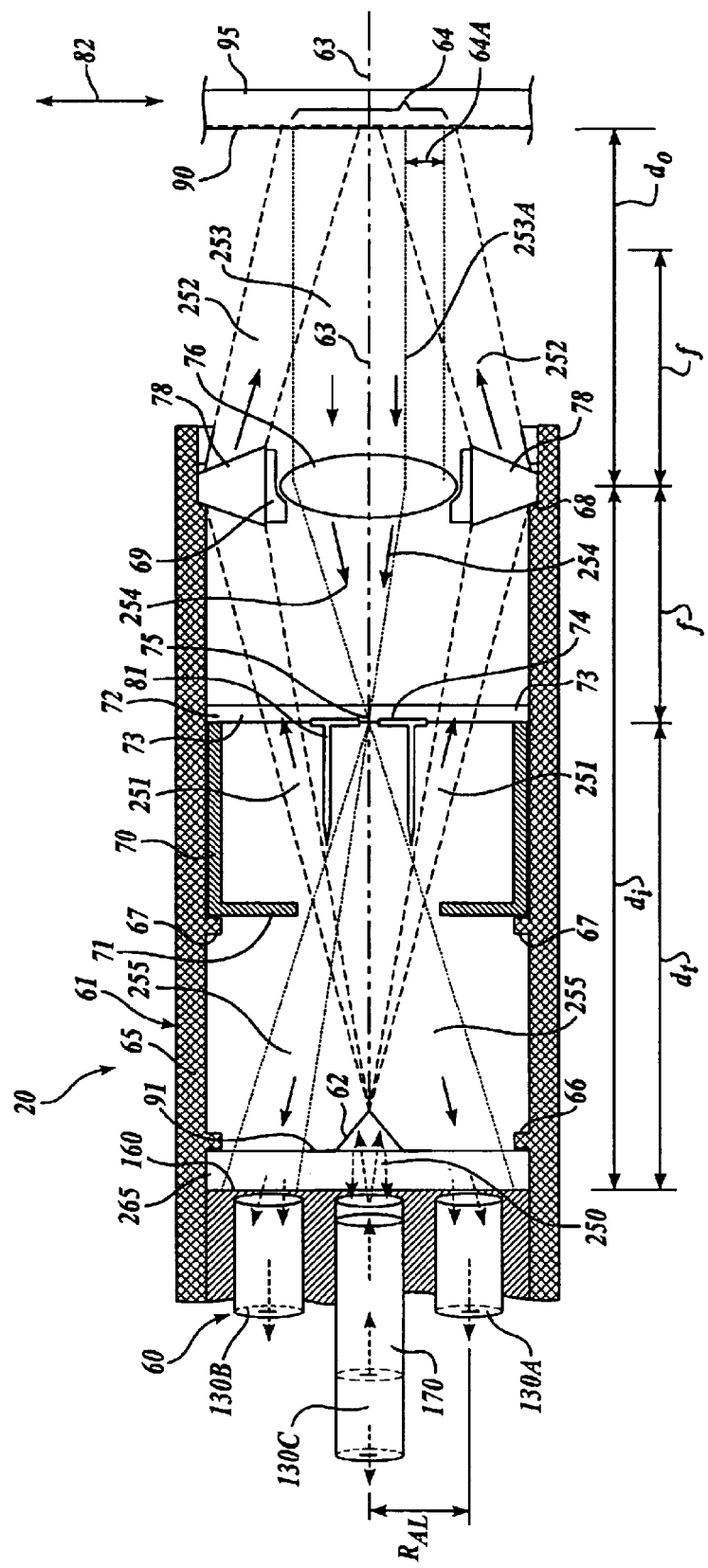
FIG. 2 is a top view generally corresponding to the fiber optic readhead arrangement of FIG. 1.

FIG. 2 is a top view generally corresponding, with only minor variation, to the first generic embodiment of a fiber optic readhead arrangement 20 shown in FIG. 1. As will be described in more detail below, the fiber optic readhead arrangement 20 passes light from a source fiber 170 in the readhead 60 through the optical assembly 61 to provide a converging annular ring of source light 252 that illuminates the scale 90. The axicon lens 62 is utilized to divert the light from the source fiber 170 away from the optical axis 63 and the imaging lens 76, and into the ring-shaped annular source lens 78 which surrounds the imaging lens 76. In one embodiment, the light from the ring-shaped annular source lens 78 is emitted from the optical assembly 61 as a converging annular ring of source light 252 that has a generally ring-shaped intensity distribution at the surface of the scale 90. In one alternative embodiment, a diffuser layer, such as a textured surface or a diffusing material layer may be included on the annular source lens 78. Such a diffuser layer causes localized diffusion in the various portions of the beam passing through the annular source lens to provide more uniform illumination at the surface of the scale 90. In any case, the annular source lens 78 generally concentrates the light in the area(s) of the scale 90 that will be imaged back through the imaging lens 76 to the area(s) of the fiber optic detector channels of the readhead 60, to provide the best practical illumination intensity at the receiving plane 160 of the readhead 60 for a given source light power.

It should be appreciated that the extremely small receiver aperture area of the fiber optic receiver channels according to this invention (the receiver optical fiber core diameter, for example) may be much smaller than most or all electronic detectors used in prior art readheads, and that such a small receiving aperture diameter severely constrains the available signal energy and the resulting signal to noise ratio in various exemplary embodiments according to this invention. It should be also appreciated that, as discussed in the incorporated '312 application, in general the degree to which the sinusoidal output signals according to this invention can be accurately interpolated to provide measurement resolution that is finer than the grating pitch depends on the available signal to noise ratio. It should be appreciated that in contrast with the relatively crude conventional optical fiber encoder readheads that are not designed to provide high resolution and high accuracy position measurement signals, it is one object of various exemplary embodiments of the ultra-miniature optical fiber readhead arrangements according to the present invention to provide micron-level or even sub-micron level resolution and accuracy. Thus, in various exemplary embodiments according to this invention where relatively high resolution and accuracy are desired, it is useful to concentrate the light in the area(s) of the scale 90 that will be imaged back through the imaging lens 76 to the fiber optic detector channels, in order to achieve relatively higher optical signal strength and the resulting relatively higher signal to noise ratio, resolution and accuracy.

The transmission of light between the readhead 60 and the scale 90 may be more specifically described as follows. At the center of the readhead 60, the source fiber 170 emits a source fiber light 250. Immediately adjacent to the output end of the source fiber 170, the source fiber light 250 generally diverges at a divergence half-angle that is determined by the effective numerical aperture of the source fiber 170. In various exemplary embodiments, the divergence half-angle is on the order of approximately 2–10 degrees. It should be appreciated that the end of the source fiber 170 is shown at a slight separation from a transparent substrate 265 in FIG. 2. However, in various exemplary embodiments, the end of the source fiber 170 abuts the transparent substrate 265.

The diverging source fiber light 250 passes through the transparent substrate 265, which carries the phase masks 120, and into the axicon lens 62. It should be appreciated that the axial dimension of the axicon lens 62 is exaggerated herein, to emphasize its general axicon lens type in various illustrations herein. The axicon lens 62 is designed according to known optical design practices to deflect and concentrate the diverging source fiber light 250 into an annular pattern of diverging axicon light 251 that diverges as it propagates between optical baffles 71 and 81 toward the annular source lens 78 at the end the optical assembly 61. In various other exemplary embodiments, a functionally similar diffractive optical element is used in place of the axicon lens 62. As shown in FIG. 2, the diverging axicon light 251 passes through the annular opening between a centrally-located the cylindrical optical baffle 81 and the surrounding optical baffle 71 of an optical baffle element 70. The nominal limits of the diverging annular path of the diverging axicon light 251 are illustrated in coarsely-dashed outline for the exemplary embodiment shown in FIG. 2. The diverging axicon light 251 then passes through a transparent section 73 of an aperture plate 72. The diverging axicon light 251 then reaches the annular source lens 78, which is designed according to known optical design practices to deflect the diverging axicon light 251 to form the converging annular ring of source light 252, such that the converging annular ring of source light 252 concentrates the source light in the area(s) of the scale 90 that will be imaged back through the imaging lens 76 to the area(s) of the fiber optic detector channels of the readhead 60, as outlined above. The areas of the scale 90 that will be imaged back through the imaging lens 76 to the fiber optic detector channels of the readhead 60 are included in an imaged region 64 that generally surrounds and includes an optical axis 63 of the fiber optic readhead arrangement 20. The nominal limits of the converging annular ring of source light 252 are also illustrated in coarsely dashed outline for the exemplary embodiment shown in FIG. 2. The converging annular ring of source light 252 illuminates the scale grating pattern of the scale 90 to give rise to a scale light 253.

The fiber optic readhead arrangement 20 includes one exemplary telecentric optical arrangement. The operation of various telecentric optical arrangements is generally known to one of ordinary skill in the art and will not be described in detail here. The telecentric arrangement of the fiber optic readhead arrangement 20 is provided by locating a limiting aperture 75 at the nominal focal distance f of the imaging lens 76 from the effective position of the imaging lens 76 along the optical axis 63. In this position at the back focal point of the imaging lens 76, an ideal pinhole aperture acts as a spatial filter to block all light rays that are not nominally parallel to the optical axis 63 when entering the imaging lens 76. Because the actual limiting aperture 75 is somewhat larger than an ideal pinhole, it actually also allows rays to pass that may vary within a few degrees of being parallel to the optical axis 63 when entering the imaging lens 76. Such an arrangement still functions to provide the benefits expected for such a telecentric arrangement, as outlined below. It will be appreciated that because only rays that are approximately parallel to the optical axis are imaged by a telecentric arrangement, in general, an object will appear to be a consistent size regardless of its location along the direction of the optical axis 63 in the field of view of a properly designed telecentric arrangement. That is, generally, for an object within its depth of field, a telecentric arrangement will show little or no magnification variation or error. This property is useful in the various exemplary embodiments according to this invention, because it means that the scale image detected by the fiber optic readhead arrangement 20 will tend to have the expected magnification, size, and pitch regardless of various mounting and/or alignment imperfections. One tradeoff of a telecentric optical arrangement is that the additional components and required spacing may require a somewhat longer and/or larger readhead.

Due to the previously outlined telecentric optical arrangement of the present exemplary embodiment, only the rays of the scale light 253 which travel approximately parallel to the optical axis 63 of the imaging lens 76 will contribute to the image that is detected by the readhead 60. Therefore, it should be appreciated that the radially-outermost nominally parallel rays passed by the limiting aperture 75 define the extents of the imaged region 64. The radially-outermost rays corresponding to the extents of the imaged region 64 are shown in finely dashed outline for the exemplary embodiment shown in FIG. 2, and correspond to the radially-outermost rays of the scale light 253 that are both parallel to the optical axis 63 and within the effective entrance pupil of the imaging lens 76. One interior parallel ray 253A is also shown as a finely dashed line in FIG. 2, and is described in further detail below.

As shown in FIG. 2, the rays of the scale light 253 that are approximately parallel to the optical axis 63 enter the imaging lens 76 and emerge as converging scale light 254.

In various exemplary embodiments, the imaging lens 76 may be a biconvex lens having a focal length f. The converging scale light 254 is focused by the imaging lens 76 and passes through a limiting aperture 75 in a masked portion 74 of the aperture plate 72. The limiting aperture 75 is located at the nominal focal length f of the imaging lens 76 from the effective plane of the imaging lens 76, making the magnification of the image of the scale 90 on the readhead 60 approximately independent of the object distance $d_o$, as outlined above and described in greater detail below. The converging scale light 254 emerges from the limiting aperture 75 as diverging scale light 255. The diverging scale light 255 forms an operably focused, or approximately focused, image of the scale grating pattern of the scale 90 at the receiving plane 160 of the readhead 60. Various considerations related to image focus are discussed in greater detail below.

In addition to the nominal limits of the scale light 253 that are illustrated in finely-dashed outline in FIG. 2, one other imaged ray 253A of the scale light 253 is also shown in finely-dashed outline in FIG. 2, to clarify how an annular region of the scale 90, generally having a width corresponding to the dimension 64A included in the imaged region 64, is imaged onto an annular region of the readhead 60 that generally corresponds to the location of the fiber optic detector channels of the readhead 60. Thus, the fiber optic readhead arrangement 20 operates to provide an image of the scale grating pattern of the grating scale 90 on the fiber optic detector channels of the readhead 60. The image of the scale grating pattern is detected by the fiber optic detector channels of the readhead 60, as described in greater detail below, and corresponding optical output signals are output along the optical fibers 130A, 130B, and 130C.

It will be appreciated that in the illustration of FIG. 2, in order to better illustrate the operation of the fiber optic readhead arrangement 20, the ends of the optical fibers 130A–130C of the readhead 60 are illustrated as being slightly removed from the surface of the transparent substrate 265, so as to better illustrate the transmission of light to the optical fibers. However, in various exemplary embodiments, the ends of the optical fibers 130A–130C abut, or nearly abut the transparent substrate 265. The phases masks 120 (not labeled in FIG. 2) are generally included in front of the ends of the optical fibers 130A–130C on the transparent substrate 265. In various exemplary embodiments, the phase masks 120 are fabricated on the surface of the transparent substrate 265 that is nearest to the optical fibers 130, and that surface is also the receiving plane 160. In various exemplary embodiments, the ends of the optical fibers 130A–130C and 170 of the readhead 60 all abut the surface of the transparent substrate 265 as closely as possible.

Regarding the magnification of the image of the scale 90 on the readhead 60 for the exemplary embodiment shown in FIG. 2, the light 255 passed by the limiting aperture 75 is transmitted a distance $d_t$ along the optical axis 63 and onto the receiving plane 160 of the readhead 60. For such a telecentric arrangement, the magnification M of the image features of the scale 90 thus depends primarily on the relationship between the focal length f and the distance $d_t$, and is approximately given by EQUATION 1 as follows:

$$M \approx \frac{d_t}{f} \quad \text{(Eq. 1)}$$

where:

f is the focal length of the imaging lens 76; and $d_t$ is the distance from the limiting aperture 75 to the receiving plane 160 of the readhead 60.

It should be appreciated that in various exemplary embodiments according to this invention, the receiving plane 160 is located to receive a focused or nearly focused image of the scale pattern features of the scale 90. It should be appreciated that in selecting the size of the pinhole aperture 75 there is a tradeoff between the depth of field provided by the optical assembly 61, that is, the amount of blurring of the image of the scale 90 when the object distance $d_o$ is varied due to readhead gap misalignment or the like, and the image intensity on the readhead 60. Aperture dimensions embodying the proper tradeoff for a particular application can be determined by analysis or experiment. In general, the pinhole aperture 75 or the like can be circular, square, rectangular, or any desired shape in various exemplary embodiments, with one or more dimensions chosen to provided the desired tradeoffs. In addition, it will be appreciated that in alternate exemplary embodiments, if the object distance $d_o$ is sufficiently well controlled by proper mounting, accurate bearings, and the like, the telecentric arrangement is not needed and the limiting aperture 75 and the aperture plate 72 may be omitted.

More generally, in various alternative embodiments where the limiting aperture 75 is relatively large and/or the limiting aperture 75 and the aperture plate 72 are omitted, the magnification will vary with the object distance $d_o$. In such a case, the approximate magnification M of the image of the illuminated portion of the scale 90 at the receiving plane 160 of the readhead 60 is given by EQUATION 2, as follows:

$$M \approx \frac{d_i}{d_o} \quad \text{(Eq. 2)}$$

where:

$d_o$ is the object distance from the scale 90 to the effective plane of the imaging lens 76; and $d_i$ is the image distance from the image at the receiving plane 160 of the readhead 60 to the effective plane of the imaging lens 76. It should be appreciated that regardless of the size of the limiting aperture, the effective magnification of a readhead arrangement according to the principles of this invention can be determined and/or verified experimentally.

In various embodiments according to the principles of this invention, the effective magnification determines the ratio of the pitch of the phase masks 120 to the pitch of the scale grating pattern of the scale 90. This is because the phase masks 120 generally act as spatial filters for the received image of the scale grating pattern of the scale 90, in the same manner as described in the incorporated '312 application where the received image of the scale grating is a self-image, instead of an image produced by an imaging lens system. In general, for a magnification of 1, the scale grating pattern of the scale 90 and the phase masks 120 would have the same pitch. For the embodiment shown in FIG. 2, when $d_t=2f$, the magnification is approximately 2 and the phase masks 120 would have a pitch that is two times the pitch of the scale grating pattern.

In various exemplary embodiments, typical scale grating pattern pitches may range from less than 4 microns to more than 40 microns. In one embodiment, the lower limit for the allowable scale grating pattern pitch is set by the limiting lateral resolution of the imaging system, which is readily calculable by those of ordinary skill in the art. However, it should be appreciated that the smaller the lateral resolution of the imaging system, the smaller the allowable depth of focus and the smaller the allowable gap tolerance. For incoherent illumination, the diffraction limit for the lateral resolution is given by EQUATION 3, as follows:

$$\sim \frac{1.22\lambda}{2NA} \qquad (Eq. 3)$$

where:

$\lambda$ is the wavelength; and

NA is the numerical aperture of the optical system.

It will be appreciated that the cutoff frequency for incoherent illumination is 2 NA/$\lambda$, while for coherent illumination the cutoff frequency is 1.33 NA/$\lambda$, and that the lateral resolution thus depends on the degree of coherence of the light. In general, any operable wavelength of visible or non-visible, and incoherent or coherent light may be used with this invention, provided that such wavelengths are compatible with the optoelectronic detectors that eventually receive the optical signals provided according to the principles of this invention.

In general, the scale grating pattern of the scale 90 may be located at the front or the back of a substrate of the scale 90. In the embodiment of FIG. 2, the scale grating pattern is located at the front of the substrate 95. In an embodiment where the scale grating pattern is at the back of a transparent substrate, the substrate may be made of glass or quartz, for example. In one embodiment, the scale grating pattern of the scale 90 consists of grating lines and spaces. In one embodiment, the lines diffusely reflect the source light to provide the previously discussed rays that are approximately parallel to the optical axis 63. The lines thus provide bright elements in the scale image received by the readhead 60. In contrast, the spaces are designed to absorb or transmit impinging source light so that it is not reflected back to the readhead 60. The spaces thus provide dark elements that strongly contrast with the bright elements provided by the diffusely reflecting lines in the scale image received by the readhead 60. In various exemplary embodiments, the scale grating pattern consists of substantially planar or flat lines and spaces. In various other embodiments, the scale grating pattern includes blazed grating elements that are designed with consideration to the angle(s) of incidence of the source light, in order to enhance the contrast between the bright and dark elements in the image of the scale grating pattern received by the readhead 60. In any case, as the fiber optic readhead arrangement 20 moves relative to the scale 90, the image of the scale grating pattern of the scale 90 moves relative to the phase masks 120. The phase masks 120 spatially filter the moving image of the scale grating pattern, and accordingly, as described in the incorporated '312 application, the optical receiver fibers receive an optical signal that varies periodically, as a function of the relative motion. Each cycle of the periodic optical signal indicates an amount of relative movement that is equivalent to the scale grating pitch $P_g$.

It should be appreciated that if high levels of signal interpolation are desired, in order to provide high resolution displacement measurement when using a fiber-optic readhead according to this invention, such high levels of signal interpolation are generally more readily achieved when the periodic optical signals vary sinusoidally. In such a case, one or more ratios based on the various optical signals vary continuously as a known function of the relative displacement between the readhead and scale, and such ratiometric displacement signals provide for high levels on interpolation at resolutions far finer than the basic pitch of the scale grating pattern of the scale 90. Thus, in various exemplary embodiments according to the this invention, a limiting aperture is provided that has a diameter that limits the optical resolution of a fiber optic readhead, as described in greater detail below. This robustly provides a sufficiently sinusoidal optical signal, without the need for other measures, in various exemplary embodiments. In various other exemplary embodiments according to the this invention, the phase masks 120 and/or the scale grating pattern of the scale 90 include various duty cycles, mask and/or grating element widths, and the like in order to spatially filter the received image of the scale pattern so as to provide more sinusoidal optical signals in a manner generally known to one of ordinary skill in the art of displacement encoder design, for example as disclosed in U.S. Pat. No. 5,576,537, to Holzapfel, which is hereby incorporated herein by reference for all of its relevant teachings. In yet other exemplary embodiments, to achieve a relatively sinusoidal optical signal, a fiber-optic readhead and scale according to the principles of this invention are intentionally mounted at a separation dimension along the optical axis 63 such that the scale image produced at the receiving plane 160 is intentionally somewhat blurred or defocused. Such separation dimensions may be determined experimentally, for example, by examining signals arising from the optical signals of an operably mounted readhead and scale, and systematically varying the separation dimension along the optical axis 63 until the most nearly sinusoidal signals are achieved. In yet other exemplary embodiments according to this invention, to achieve a relatively sinusoidal optical signal all of the above methods may be combined. That is, a suitable limiting aperture dimension and various duty cycles, mask and/or grating element widths, and the like are used in combination with optionally a slightly defocusing separation dimension to provide relatively sinusoidal signals.

Using the readhead arrangement illumination configurations described herein, or sufficient external illumination of the imaged region of the scale pattern, the signal-to-noise ratio associated with a fiber optic readhead arrangement according to this invention can be quite high, as high as at least one of 32, 40, 64, 128 or even 256, for example. Furthermore, when one or more of the methods outlined above are used, it should be appreciated that in various exemplary embodiments according to this invention a fiber optic readhead arrangement can provide sinusoidal signals that vary from an ideal sinusoidal function by as little as at least one of $1/16$, $1/32$, or even $1/64$ or less of the peak-to-peak variation of the sinusoidal function. Thus, overall, a variety of fiber optic readhead arrangements according to this invention can provide accurately interpolated displacement measurements with resolutions as high as at least one of $1/16$, $1/32$, or even $1/64$ or less of the scale grating pitch $P_g$.

Regarding the system of optical baffles provided in the exemplary embodiment shown in FIG. 2, the optical baffles include a centrally-located cylindrical optical baffle 81, a surrounding optical baffle 71, and an additional annular optical baffle 91 that may be affixed to the transparent substrate 265. This set of optical baffles is provided to prevent ambient light and/or stray reflected light that may enter the readhead arrangement 20 through the annular source lens 78 from reaching the fiber optic detector channels of the readhead 60. For example, as illustrated in FIG. 2, it can be seen the optical baffle 71 generally prevents all or most of the light passing into the annular source lens 78 at its upper portion in FIG. 2 from being transmitted to the detection region of the readhead 60 that is in the vicinity of the optical fiber 130B. Similarly, cylindrical optical baffle 81 and the optical baffle 91 generally prevent all or most of the light passing the annular source lens 78 at its upper portion in FIG. 2 from being transmitted to the detection region of the readhead 60 that is in the vicinity of the optical fiber 130A. It should be appreciated that due to the annular configuration of each of the baffles, each detection region of the readhead 60 is provided with the protection from stray light, as described above.

The readhead arrangement 20 shown in FIG. 2 includes various features usable to simplify the fabrication and assembly of this and other readhead arrangements according to the principles of this invention. For example, as previously mentioned, in addition to fabricating the phase masks 120 on the transparent substrate 265, the annular optical baffle 91 may also be fabricated on the transparent substrate 265, for example by known thin or thick film application and patterning techniques. Alternatively, another type of coating or a separate material may form the annular optical baffle 91 and it may be bonded to a surface of the transparent substrate 265. The axicon lens 62 may also be bonded to the surface of the transparent substrate 265 with a suitable optical grade adhesive, approximately as shown in FIG. 2. Alternatively, in various other exemplary embodiments a functionally similar diffractive optical element used in place of the axicon lens 62 may be bonded to, or fabricated directly on, the transparent substrate 265.

The transparent substrate 265 is generally described as part of the readhead 60 herein, and in various exemplary embodiments is bonded to the readhead 60 as described in the incorporated '312 application and as described further below with reference to FIG. 3. As shown in FIG. 2, in various exemplary embodiments, the inner diameter of the optical assembly housing 65 fits with close tolerance over the outer diameter of the readhead 60, and is properly located along the optical axis 63 with respect to the readhead 60 by abutting the transparent substrate 265 against a locating ridge 66 that is fabricated at the proper axial location in the optical assembly housing 65.

The optical assembly housing 65 also includes a locating ridge 67 that is fabricated at the proper axial location for properly locating the optical baffle element 70 and the optical baffle 71. In addition, the optical baffle element 70 has the proper axial dimension for properly locating the aperture plate 72 and the limiting aperture 75 relative to both the readhead 60 and the imaging lens 76 along the optical axis 63. In various exemplary embodiments, the aperture plate 72 is butted against and/or bonded to the optical baffle element 70, approximately as shown in FIG. 2. The masked portion 74 and the limiting aperture 75 may be fabricated on the aperture plate 72, for example by thin film patterning techniques. Alternatively, another type of coating or a separate material may form the masked portion 74 and the limiting aperture 75, and it may be bonded to a surface of the aperture plate 72. The cylindrical optical baffle 81 may also be bonded to the surface of the aperture plate 72, approximately as shown in FIG. 2.

The optical assembly housing 65 also includes a locating ledge 68 that is fabricated at the proper axial location for properly locating the annular source lens 78 and the imaging lens 76. In the particular embodiment shown in FIG. 2, the annular source lens 78 is butted against the locating ledge 68 and bonded in place. An annular mounting element 69 has an outer diameter that fits snugly within the inner diameter of the annular source lens 78 and an inner diameter and a ledge that align and support the imaging lens 76, approximately as shown in FIG. 2. In one exemplary assembly method, the annular mounting element 69 and the imaging lens 76 are bonded together and then located at precisely the proper axial location along the optical axis 63 relative to both the readhead 60 and the limiting aperture 75, before the annular mounting element 69 is bonded to the annular source lens 78. In various other embodiments, the annular source lens 78 and the imaging lens 76 are fabricated as a single refractive or diffractive (or both) element or bonded directly together such that the annular mounting element 69 is omitted. Of course a variety of other assembly methods and part configurations that provide functional features similar to the previously described exemplary embodiments will be apparent to one skilled in the art, therefore the previously described exemplary embodiments are illustrative only, and not limiting.

In a first specific exemplary embodiment of the readhead arrangement 20, various elements and dimension are approximately as follows. The imaging lens 76 is a biconvex lens having a minimum clear aperture of approximately 1.0 mm. The nominal operating object distance $d_o$ from the effective plane of the lens to a nominally located scale pattern plane is approximately 5.3 mm. The focal length f of the imaging lens 76 is approximately 3.5 mm, which is also the distance from the effective plane of the imaging lens 76 to the plane of the limiting aperture 75. The limiting aperture 75 is approximately 400 micrometers in diameter. The phase masks 120 are fabricated on the surface of the transparent substrate 265 that is nearest to the optical fibers 130, and that surface is also the receiving plane 160. The distance $d_t$ from the receiving plane 160 to the limiting aperture 75 is nominally 7.0 mm. Thus, the magnification of the image of the scale pattern of the scale 90 at the receiving plane 160 is approximately 2.0, according to EQUATION 1, and may be determined more precisely by experiment. The receiver fibers 130 each have an outer diameter of approximately 200 micrometers and are each located at a receiver aperture location radius $R_{AL}$ that is approximately 200 micrometers from the optical axis 63 and the center of the source fiber 170. The source fiber 170 also has an outer diameter of approximately 215 micrometers. Thus, the receiver fibers 130 are close-packed against the source fiber 170.

The axicon lens is designed and positioned according to known optical design principles to provide a divergence half-angle of approximately 12 degrees for the radially-outermost ray and approximately 6 degrees for the radially-innermost ray of the diverging axicon light 251, which corresponds to an outer diameter of approximately 4.5 mm and an inner diameter of 2.2 mm for the annular source lens 78. Thus, the inner diameter of the optical assembly housing 65 is on the order of 4.5 mm. The annular source lens 78 is designed according to known optical design principles to deflect the diverging axicon light 251 such that the converging annular ring of source light 252 converges at a nominal half-angle of approximately 20 degrees.

This specific embodiment includes various optical baffles that are dimensioned and positioned to function similarly to the optical baffles 71, 81 and 91, approximately as outlined above. However, it will be appreciated that FIG. 2 is not drawn to scale according to the dimension outlined above for this specific exemplary embodiment. For this specific exemplary embodiment it is difficult to prevent all light that may enter the annular source lens 78 from reaching the optical detector channels. Thus, the optical output signals may be somewhat degraded by this stray light. Nevertheless, this specific embodiment of the readhead arrangement 20 will still provide usable optical output signals and others beneficial features according to the principles of this invention. According to the foregoing description, in various exemplary embodiments the overall diameter of the readhead arrangement 20 may easily be made as small as approximately 7 mm, 5 mm, or even smaller.

In a second specific exemplary embodiment of the readhead arrangement 20, various elements and dimension are approximately as follows. The imaging lens 76 is a refractive lens or a diffractive optical element lens having a minimum clear aperture of approximately 0.9 mm. The nominal operating object distance $d_o$ from the effective plane of the lens to a nominally located scale pattern plane is approximately 1.9 mm. The focal length f of the imaging lens 76 is approximately 1.5 mm, which is also the distance from the effective plane of the imaging lens 76 to the plane of the limiting aperture 75. The limiting aperture 75 is approximately 150 micrometers in diameter. The phase masks 120 are fabricated on the surface of the transparent substrate 265 that is nearest to the optical fibers 130, and that surface is also the receiving plane 160. The distance $d_r$ from the receiving plane 160 to the limiting aperture 75 is nominally 5.8 mm. Thus, the magnification of the image of the scale pattern of the scale 90 at the receiving plane 160 is approximately 3.8, according to EQUATION 1, and may be determined more precisely by experiment. In various exemplary embodiments, the receiver fibers 130 each have the same outer diameter selected within a range of approximately 250–500 micrometers and are each located at a receiver aperture location radius $R_{AL}$ that is selected within a range of approximately 750–500 micrometers from the optical axis 63 and the center of the source fiber 170. The source fiber 170 has an outer diameter selected within a range of approximately 100–500 micrometers.

The axicon lens is designed and positioned according to known optical design principles to provide a divergence half-angle of approximately 9.7 degrees for the radially-outermost ray and approximately 4.7 degrees for the radially-innermost ray of the diverging axicon light 251, which corresponds to an outer diameter of approximately 2.5 mm and inner diameter of approximately 1.2 mm for the annular source lens 78. Thus, the inner diameter of the optical assembly housing 65 is on the order of 2.5 mm. The annular source lens 78 is designed according to known optical design principles to deflect the diverging axicon light 251 such that the converging ring of source light 252 converges at a nominal half-angle of approximately 43 degrees.

This specific embodiment also includes various optical baffles that are dimensioned and positioned to function similarly to the optical baffles 71, 81 and 91, approximately as outlined above. For this specific exemplary embodiment, if the receiver fibers are selected with a relatively smaller size, and the receiver aperture location radius $R_{AL}$ relative to the optical axis 63 is selected with a relatively larger value, it is possible to position the various optical baffles to prevent much or all of the light that enters the annular source lens 78 from reaching the optical detector channels. Thus, this specific embodiment of the readhead arrangement 20 provides high quality optical output signals and other beneficial features according to the principles of this invention. According to the foregoing description, in various exemplary embodiments the overall diameter of the readhead arrangement 20 may easily be made as small as approximately 5 mm, 3 mm, or even smaller.

Figure 3:
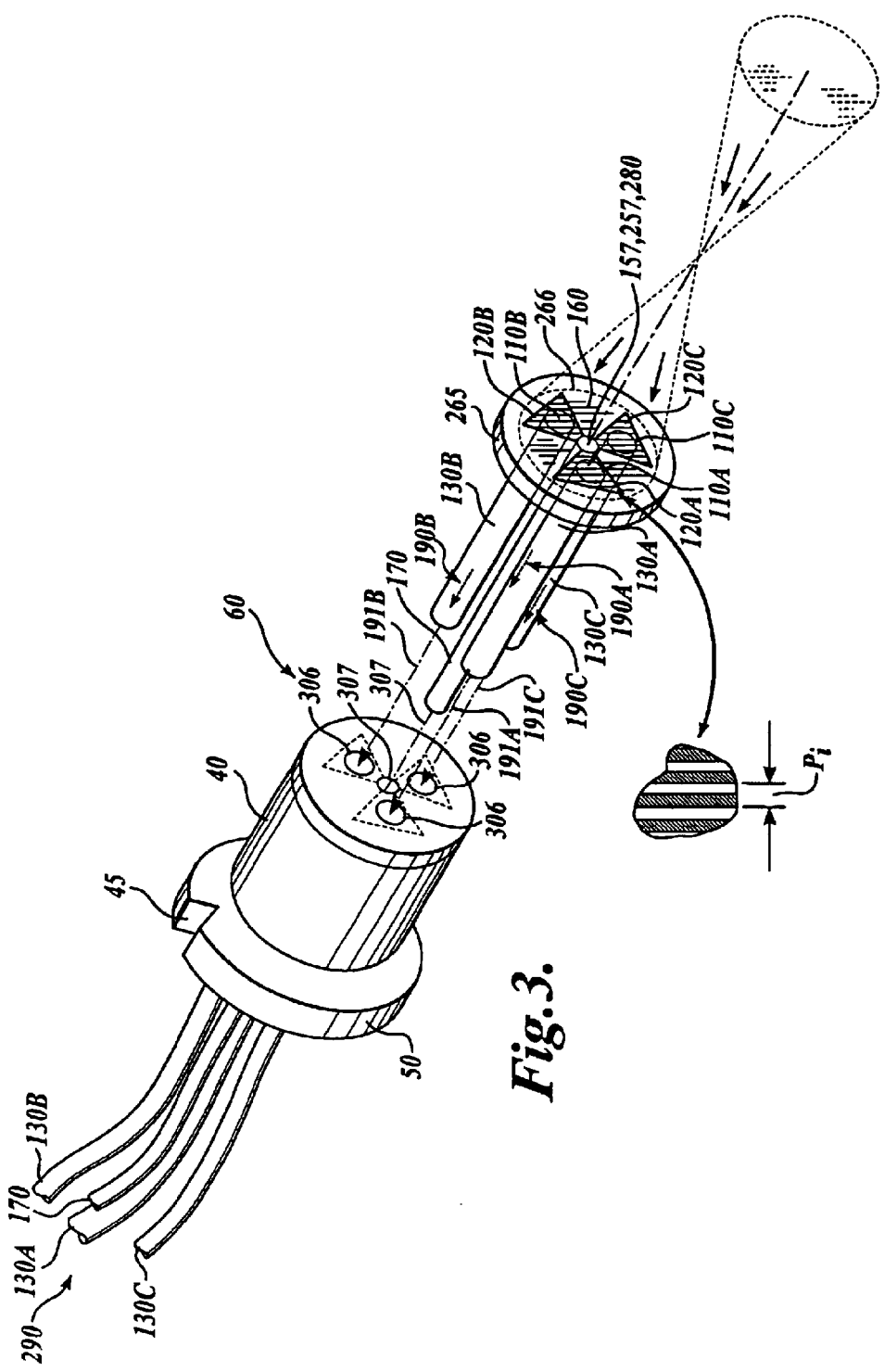
FIG. 3 is a partially exploded isometric view of the first generic embodiment of a fiber optic readhead included in FIG. 1.

FIG. 3 is a partially exploded view of the readhead 60 of FIG. 1 that further generally illustrates how the phase masks 120 spatially filter the moving image of the scale grating pattern as outlined above, and also further illustrates one exemplary assembly arrangement for the readhead 60. As shown in FIG. 3, the readhead 60 includes three fiber optic receiver channels 190a, 190b, and 190c, as generally described in the incorporated '312 application and as follows. The fiber optic receiver channel 190a includes the receiver channel aperture 110a, the phase mask 120a, and the receiver optical fiber 130a. The receiver channel aperture 110a is located behind the phase mask 120a. Similarly, the fiber optic receiver channel 190b includes the receiver channel aperture 110b, the phase mask 120b, and the receiver optical fiber 130b. Similarly, the fiber optic receiver channel 190c includes the receiver channel aperture 110c, the phase mask 120c, and the receiver optical fiber 130c.

For each fiber optic receiver channel 190, the phase mask 120 includes a grating that completely covers the receiver channel aperture 110, acting as a spatial filter for incoming illumination. The receiver optical fiber 130 is aligned with the receiver channel aperture 110 such that nominally all illumination received by the receiver channel aperture 110 is channeled down the optical fiber 130 to provide an optical signal 191. In various exemplary embodiments the receiver channel aperture 110 is simply a flat end of the receiver optical fiber 130. In various other exemplary embodiments the receiver channel aperture 110 is a shaped end of the receiver optical fiber 130. In various other exemplary embodiments the receiver channel aperture 110 is a compact refractive or diffractive lens, which gathers the incoming illumination through the phase mask 120, concentrates the light, and directs the light to the end of the receiver optical fiber 130, which is aligned to receive the light efficiently.

It should be appreciated that for reduced errors and more consistent performance from receiver to receiver in a various exemplary fiber optic readhead arrangements according to this invention, the signal amplitudes between the various fiber-optic receiver channels are nominally balanced, and phase errors resulting from edge effects at the boundary of the receiver aperture and/or phase masks should be minimized. It should also be appreciated that when the pitch of the phase masks is coarse relative to the size of the optical fiber receiver apertures, the effective open aperture area of each channel between the bars of the phase masks can depend significantly on the phase mask offset relative to the aperture center or outline. Since the phase mask offset may be different for different fiber-optic receiver channels, this may unbalance the amplitudes of the various phase signals and potentially cause related phase measurement errors.

Thus, for reasons described herein, and in greater detail in the incorporated '312 application, in various exemplary embodiments according to this invention each receiver channel aperture 110 spans at least one full period or pitch of the associated phase mask 120, making the phase of the optical signal passing into the receiver channel aperture 110 at least somewhat insensitive to the positioning of the light collecting area of the receiver channel aperture 110 relative to the light-blocking elements of the phase mask 120. In various other exemplary embodiments each receiver channel aperture 110 spans at least three full periods of the associated phase mask 120, making the phase of the optical signal passing into the receiver channel aperture 110 even less sensitive to the positioning of the light collecting area of the receiver channel aperture 110. More generally, the more periods of the phase mask 120 that are spanned by the receiver channel aperture 110, the less sensitive the phase of the optical signal passing into the receiver channel aperture 110 will be to its positioning because offset-related edge quantization effects, formed in the fiber receiver aperture by the phase mask grating bars, will be a smaller proportion of the overall aperture area. It should be appreciated the previous fiber optic encoders designed for only relatively crude accuracy and resolution have not adequately considered this factor. In various other exemplary embodiments each receiver channel aperture 110 spans at least six full periods of the associated phase mask 120, making the phase of the optical signal passing into the receiver channel aperture 110 even less sensitive to the positioning of the light collecting area of the receiver channel aperture 110. In any case, in various exemplary embodiments, the receiver channel aperture 110, the phase mask 120 and the end of the receiver optical fiber 130 of each fiber optic receiver channel 190 are fastened in a fixed relationship to each other by adhesives or other suitable methods.

The location of the receiver channel apertures 110 is conveniently described with reference to a channel arrangement center 157 of the fiber optic receiver channel arrangement. In various high accuracy optical fiber readhead embodiments according to this invention, the channel arrangement center 157 is positioned to coincide with the nominal illumination field center 257 of any illumination field 266 associated with the scale pattern image presented to the fiber optic receiver channel arrangement. The effective center of each respective receiver channel aperture 110a–110c is located at a respective location radius from the channel arrangement center 157 and the optical axis 63. The receiver aperture location radius is generically indicated as $R_{AL}$ herein. For purposes of this invention, in various embodiments where a receiver channel aperture 110 does not have an obvious geometric center, the effective center may be taken as the centroid of the aperture area.

In various exemplary embodiments, the various receiver channel apertures 110a–110c are identical and their respective location radii are identical. Generally, using identical fiber optic receiver channels 190 in a fiber optic readhead according to this invention allows simpler construction, simpler signal processing and relatively higher measurement accuracy. However, more generally, the receiver channel apertures 110 and/or their respective location radii need not be identical in various exemplary embodiments according to this invention.

The fiber optic receiver channels 190 are generally arranged in a fixed relationship to each other. In particular, for the readhead 60, the gratings of the phase masks 120 of each fiber optic receiver channel 190 are nominally coplanar and are fixed in a particular spatial phase relationship with respect to one another in the receiving plane 160. In various exemplary embodiments the phase masks 120 are fixed relative to one another by fabricating them on a single mask substrate 265.

In various exemplary embodiments according to this invention, a particularly simple and effective embodiment of the light source 280 is the end of a single optical fiber that transmits coherent or incoherent light provided by a remote laser diode, LED, or other suitable light source, as exemplified by the illumination fiber 170. In various other exemplary embodiments, the light source 280 is two or more such sources. In yet other exemplary embodiments, the light source 280 is provided by a miniature solid state laser element or LED contained in the fiber optic readhead. In such cases it should be appreciated that the readhead construction may become more complex and costly, and some of the benefits of an all-optical readhead are lost. However, even in such cases, at least some of the benefits of a readhead incorporating an all-optical receiver channel arrangement according to this invention will remain, and other benefits may be gained.

It should be appreciated that in this embodiment of the fiber optic readhead 60, the light source 280 is also nominally aligned with the illumination field center 257 and the channel arrangement center 157. The alignment of all components is readily achieved in various exemplary embodiments by the use of an alignment hole set including receiver fiber holes 306 and a source fiber hole 307 generally located proximate to and aligned with the phase masks 120. The alignment hole set may be provided in a plate located on the front of the ferrule 40, or alternatively by holes provided directly in the ferrule 40. In either case, the various fiber ends are inserted and fixed in the appropriate holes to provide the required alignments. In various exemplary embodiments, the receiver optical fibers 130a, 130b, and 130c and are polished flush with the end of the element that includes the alignment hole set 304 prior to assembling the element carrying the phase masks 120.

FIG. 3 shows the alignment hole set with the receiver fiber holes 306 in the ferrule 40, and a source fiber hole 307, if applicable in various embodiments. The alignment hole set is to be positioned proximate to the phase masks 120, not in the "exploded" position illustrated. In the nominally aligned receiver plane 160, for each respective fiber optic receiver channel 190, the respective phase mask 120 spatially filters the incoming illumination corresponding to the image of the scale grating pattern of the scale 90. In the exemplary embodiment shown in FIG. 3, the respective phase masks 120a, 120b and 120c each have a mask pitch $P_m$ that is the same as an image pitch $P_i$ of the periodic image of the scale grating pattern of the scale 90, and they are arranged at respective spatial phase positions of 0 degrees, 120 degrees and 240 degrees in terms of the periodic image. Thus, the fiber optical fiber receiver channels 190a, 190b and 190c receive illumination that is similarly spatially filtered except for a spatial phase difference. It will be appreciated that as the scale 90 moves by an increment $P_g$ of the scale grating pattern along the measuring axis 82, the image moves by an increment $P_i$ relative to the phase masks 120. Thus, in various exemplary embodiments, the optical signals 191a, 191b and 191c corresponding to the optical receiver channels 190a, 190b and 190c show approximately identical variations as the scale 90 moves along the measuring axis 82, but with relative phase shifts of 120 degrees.

It should be noted that the image representation in FIG. 3 is schematic. In practice, the scale grating pattern image has dark areas that are approximately the same width as the bright areas of the pattern image, and the image is slightly blurred either by a limited resolution of the optical system of the readhead arrangement 20 relative to the pitch of the scale grating pattern, or by otherwise locating one or more elements of the readhead arrangement 20 or the scale 90 to slightly defocus the image of the scale grating pattern, or by spatial filtering with various scale or mask elements as outlined previously. In any case, a defocused or blurred image of the scale pattern is operable for the purposes of the invention, and even desirable in various exemplary embodiments. In such embodiments, the distribution of light intensity along the various grating bars of the image of the scale grating pattern will exhibit an approximately sinusoidal variation, rather than a square, triangular, trapezoidal, or other non-sinusoidal variation, which is desirable for enhancing the measurement accuracy in various exemplary embodiments according to this invention. Thus, as noted above, the optical receiver channels 190a, 190b, and 190c, corresponding to each of the phase masks 120a, 120b, and 120c, show approximately identical sinusoidal intensity variations as the scale 90 moves along the corresponding measuring axis 82.

Well known methods are available for determining the displacement of the scale 90 relative to the phase masks 120a, 120b and 120c based on such "three-phase" displacement signals. One exemplary method is described in the previously incorporated '312 application. In particular, in one exemplary embodiment of the present invention, the three optical signals 191a, 191b and 191c of the readhead 60 can be processed by the exemplary method described in the '312 application to determine two derived quadrature signal values $Q_1$ and $Q_2$. In the general case, the two derived quadrature signal values $Q_1$ and $Q_2$ can be processed to determine a current phase position φ within a wavelength or period $P_g$ of the scale grating pattern using a two argument arctangent function that is modulo 2π:

$$\phi = atan2(Q_1, Q_2) \quad (Eq. 4)$$

The two-argument "atan2" function shown in EQUATION 4 is available and described in a number of publicly available mathematical programs. The function result is the arctangent of $Q_1/Q_2$, in radians. However, the use of two arguments allows the determination of the quadrant of the resulting angle, so that the result is between –pi and +pi rather than –pi/2 and +pi/2. The scale 90 and the readhead arrangement 20 can be used to provide a position measurement within one respective wavelength or period along the direction of the measuring axis 82 of the scale 90 by multiplying the respective wavelength or pitch $P_g$ by the current respective phase position φ. During displacement, the number of accumulated wavelengths can be counted by known methods to provide displacement and/or position measurements over a long range. In one exemplary embodiment, the wavelength or pitch $P_g$ of the scale 90 is approximately equal to 20 microns. In various other exemplary embodiments, the wavelength of the scale 90 is chosen within a range of approximately 4 to approximately 40 microns. It should be appreciated that in various exemplary embodiments according to this invention, care is taken to insure that the pitch $P_g$ and the resolution of the imaging system of the fiber optic readhead arrangement are compatible. In particular, one important consideration is that the resolution of the optical system must be able to at least partially resolve the features of the scale pattern. Another important consideration in some embodiments where high accuracy interpolation is a particular objective is that the resolution of the optical system should blur the image of the scale pattern to a desired degree, as discussed previously, such that the signal derived from spatial filtering the scale image is at least approximately sinusoidal as a function of the scale displacement, as previously described. However, in embodiments where it is not a particular objective to achieve high interpolation accuracy, this later consideration is relatively less important.

In any case, the exemplary fiber optic readhead 60 shown in FIG. 3 is usable in a variety of fiber optic readhead arrangements according to this invention to provide an incremental displacement measuring system. The exemplary fiber optic readhead 60 used in the exemplary fiber optic readhead arrangement 20 provides a three-phase measurement system. However, it will be appreciated that alternative embodiments of the phase masks 120, along with corresponding alternative arrangements of the optical receiver channels 190, as described in the incorporated '312 application, are usable in the generic fiber optic readhead arrangement 20 to provide measurement systems having a different number of phases.

Figure 4:
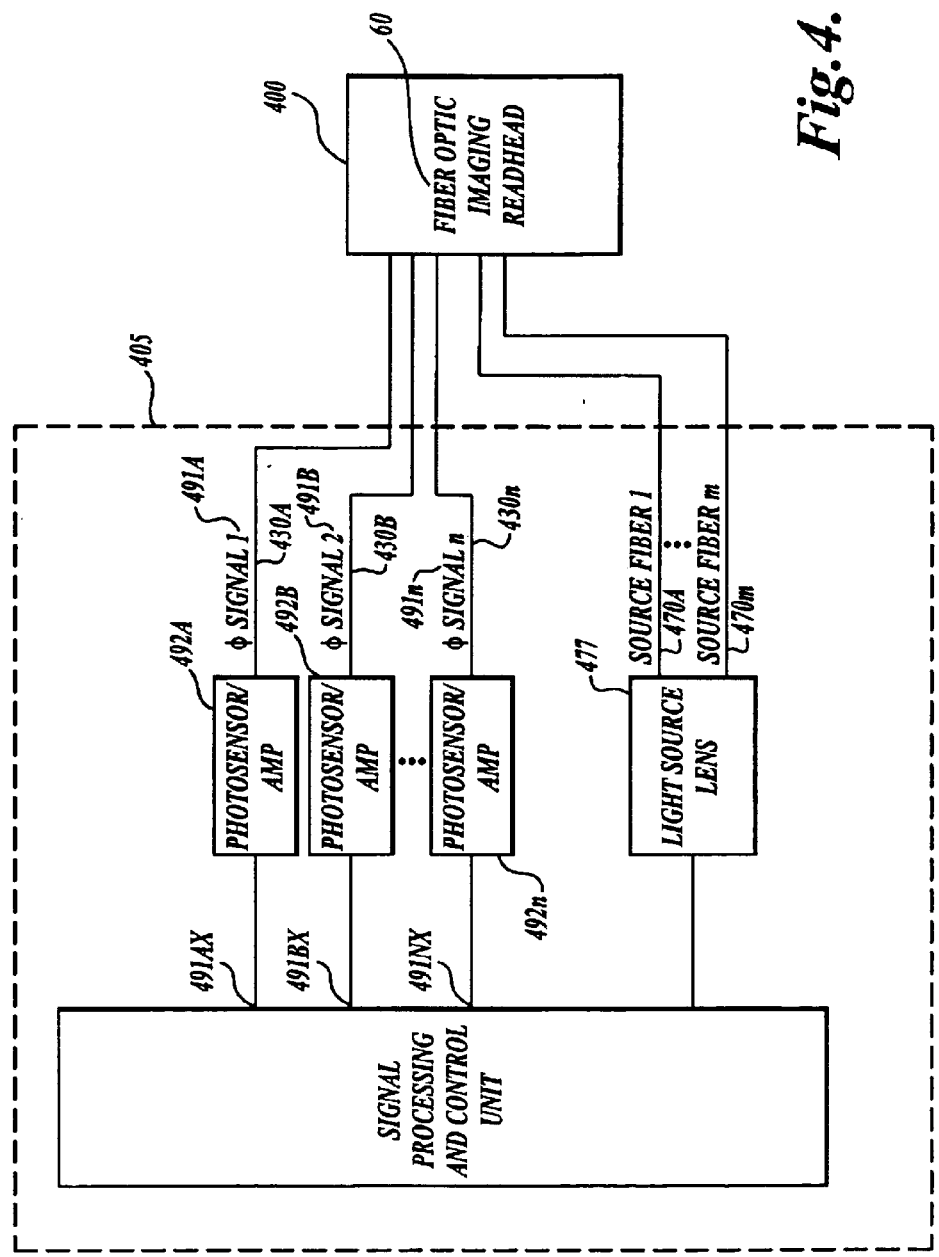
FIG. 4 shows a block diagram including a remote electronic interface unit usable in conjunction with a fiber optic readhead arrangement according to this invention.

FIG. 4 shows a block diagram including a generic remote electronic interface unit 405 that is usable in conjunction with a fiber optic readhead arrangement according to this invention, generically represented by a fiber optic readhead arrangement 400. The remote electronic interface unit 405 includes a signal processing and control unit 493, a light source 477 that may include an optional lens, and an embodiment-specific plurality of photosensor/amps 492A to 492n. The light source/lens 477 may include other optics such as optical isolators or the like. The light source/lens 477 and the photosensor/amps 492A to 492n are coupled to the readhead 60 of the fiber optic readhead arrangement 400 through light source optical fiber 470A–470M and receiver optical fibers 430A to 430n, respectively.

In one embodiment, a single source fiber 470A may be used. Also, while the light source/lens 477 is illustrated as a single unit, in an alternate embodiment multiple separate light sources could be used. For example, the light source/lens 477 may consist of one or more individual light source components or a light source array, one per light source fiber, or a single light source that is distributed into multiple fibers either directly or after being initially input into a single fiber that feeds into "split" fibers. In various embodiments, the type of light source optical fibers 470 which provide light to the readhead are governed by considerations related to the particular embodiment of the fiber optic readhead arrangement 400 that is to be used in conjunction with the remote electronic interface unit 405. Such considerations are discussed elsewhere herein.

The optical fibers 430 and 470 may be routed within a readhead cable (not shown) that gathers and protects the optical fibers between the fiber optic readhead arrangement 400 and the remote electronic interface unit 405. A single readhead cable or multiple readhead cables may be used. In various exemplary embodiments according to this invention, the readhead cable may be several meters long or more. The receiver optical fibers 430A to 430n carry the optical signals 491A to 491n, respectively. The optical signals 491A to 491n are phase signals provided as described above and further below.

The light source/lens 477 receives power and may receive gain control signals from the signal processing and control unit 493. As described above, the light source/lens 477 transmits light through the source optical fibers 470A to 470n to the fiber optic readhead arrangement 400 and onto the scale grating pattern of the scale 90. The fiber optic detector channels of the fiber optic readhead arrangement 400, such as the fiber optic receiver channels 190a to 190c described above, or the like, receive light from the scale grating pattern of the scale 90 and provide the signals 491A to 491n, which are input to the photosensor/amps 492A to 492n, respectively. The photosensor/amps 492A to 492n provide amplified electronic output signals 491Ax to 491nx to the signal processing and control unit 493. In various exemplary embodiments, the signal processing and control unit 493 then determines a position, for example, according to the equations and teachings outlined above.

It will be appreciated that in various exemplary embodiments described further below, an optical fiber readhead according to this invention may provide a plurality of optical fiber receiver channels carrying optical signals that are summed. For such embodiments, fibers carrying the optical signals that are summed can interface to the same photosensor/amp 492 in order to provide the desired signal summing, or to different photosensor/amps 492 which have their signals summed electronically during additional signal processing. For such embodiments, the additional fibers carrying the additional optical signals can interface by similar additional connections to a light source/lens 477 and similar photosensors/amps 492 in order to provide the desired additional signals for signal processing. Thus the configuration shown in FIG. 4 is intended to be illustrative only and not limiting.

FIGS. 5A and 5B show a second exemplary embodiment of a fiber optic readhead 60a according to this invention. The fiber optic readhead 60a is usable in a variety of fiber optic readhead arrangements according to this invention. The fiber optic readhead 60a operates substantially similarly to the generic fiber optic readhead 60 described above, and includes similar components. Due to these similarities in configuration and operation, only certain aspects of the fiber optic readhead 60a that require additional explanation are described below.

As shown in FIGS. 5A and 5B, the fiber optic readhead 60a includes a first set of three fiber optic receiver channels 590A–590C, which operate similarly to the previously described fiber optic receiver channels 190. It should be appreciated that the fiber optic readhead 60a provides a first example of a "balanced pair" fiber optic readhead according to this invention. To provide a balanced pair fiber optic readhead according to this invention, the fiber optic readhead 60a also includes a second set of three respective balanced fiber optic receiver channels 590Ax–590Cx that are respectively arranged in "balanced pairs" on opposite sides of the illumination field center 257 from the respective fiber optic receiver channels 590A–590C. The pairs of numbers 1—1, 2—2, and 3—3 shown on the optical fiber receiver apertures 510 are indicative of the balanced pairs.

As shown in FIG. 5A, a readhead housing 500 includes a cylindrical ferrule 540. The inner diameter of the ferrule includes a hole 541 which fits with a slight interference fit over a close-packed group of optical receiver fibers 530 and central optical source fiber 570 of the readhead 60a. In one exemplary assembly method, the fibers with prepared flat ends are aligned and inserted in the ferrule 540 from the back end and inserted until they protrude slightly beyond a mounting surface 542. Then, the phase mask set 520 carried on the phase mask element 561 is aligned to the fiber ends under a microscope, pushed against the fiber ends to make it coplanar with the mounting surface 542 and bonded tight to the mounting surface 542. The fibers are then bonded to the ferrule and each other. Alternatively, the mounting surface 542 is made flush with the end of the ferrule 540 and the fibers with prepared flat ends are aligned and inserted in the ferrule 540 from the back end until they protrude slightly beyond the mounting surface 542. Then, adhesive is placed around the end of the fibers to provide support and to fix the fibers to the ferrule 540. Then the fibers and adhesive are fine ground and/or polished back to flush or nearly flush with the mounting surface 542. Then, the phase mask set 520 carried on the phase mask element 561 is aligned to the fiber ends under a microscope, pushed against the fiber ends and bonded tight to the mounting surface 542.

In one exemplary embodiment, the phase masks set 520 is fabricated on the "inside" of the phase mask element 561, nearest the fiber ends. A light source 580 is provided by a core region of a source fiber 570 and emitted at the end of the source fiber 570. In one exemplary embodiment, the source fiber 570 is a single mode fiber having a core area used as a point source for emitting the source light, and is the optical fiber part number FS-SN-3224 made by 3M Corporation, that has an outer diameter $D_{SF}$ of 250 microns. The receiver optical fibers 530 are all the same commercially available multimode fiber that is a silica fiber with 200/220/250 micron core/cladding/buffer diameters $D_{RA}/D_{RC}/D_{RF}$. Thus, all of the source and receiver fibers in the fiber optic readhead 60a have the same 250 micron outer diameter and can therefore be arranged in an advantageous close packing assembly arrangement according to this invention that allows both highly accurate and economical precision alignment and assembly. In this exemplary embodiment, the advantageous close packing assembly arrangement is a hexagonal close packing assembly arrangement, with each fiber center separated from adjacent fiber centers by the dimension $D_{RA}=D_{SF}=$the aperture location radius $R_{AL}$.

Each of the receiver optical fibers 530 and the source fiber 570 has a cladding and a core. The outer diameter of the cladding is represented by the outer circles, and the outer diameter of the core is represented by the inner circles. It can be seen that in the embodiment shown in FIG. 5B, the source fiber 570 has a relatively small core, with reference to the outer diameter of its cladding. In contrast, relative to the outer diameter of their cladding the receiver optical fibers 530A–530C and 530Ax–530Cx have relatively large cores, which act as the receiver apertures 510A–510C and 510Ax–510Cx in this exemplary embodiment.

It will be appreciated that in comparison to the 3-fiber receiver arrangement used in the fiber optic readhead 60 shown in FIGS. 1–3, the balanced 6-fiber receiver arrangement of this embodiment 60a provides twice as much received light, and therefore twice the potential signal strength in comparison to the fiber optic readhead 60. Furthermore, the balanced pair arrangement of the receiver apertures 510 provides balanced optical signals that can be combined physically, and/or in various signal processing operations, to reject certain errors due to readhead misalignment to further increase measurement accuracy, as described in the incorporated '312 application.

It should be appreciated that when the fiber optic readhead 60a is incorporated into a high resolution all optical fiber optic readhead arrangement, such as the fiber optic readhead arrangement 20, for example, it is possible for the fiber optic readhead arrangement 20 to have a diameter of approximately 1.0 mm or less. It should be appreciated further that the fiber optic readhead 60a provides low-cost precision "self-assembly". It should also be appreciated that the source fiber 570 is intentionally "oversized" solely for these assembly purposes.

As shown in FIG. 5A, the phase mask element 561 includes a phase mask set 520 which includes the phase masks 520A–520C and 520Ax–520Cx. Each of the phase masks 520A–520C and 520Ax–520Cx includes grating bar elements 521 that are opaque, or otherwise fabricated to block received light. The grating bars 521 are arrayed on the surface 562 of a substrate 565 that is transparent to the readhead light. Chrome, copper, and oxides thereof are common materials that may be used for patterning the grating bars 521. Glass and quartz are common substrate materials that may be used for the substrate 565. The active mask area of each of the phase masks 520A–520C and 520Ax–520Cx is the area containing the grating bars 521. This active mask area should be of sufficient size to cover the clear aperture area of the corresponding receiver apertures 510A–510C and 510Ax–510Cx with extra tolerance for variations in assembly positioning. Shown at the center of the mask element 561 is an alignment ring 563 having a clear aperture 564 for the source light from the optical fiber 570, discussed above. The size of the clear aperture is, for example, several times greater than the single-mode core diameter, which is in one embodiment on the order of $D_{SA}=4$ microns. In one exemplary embodiment the phase mask element 561 is made of soda lime glass, has a thickness of 0.25 mm and a diameter that is matched to the corresponding inner diameter of the ferrule 540.

The mask grating bars 521 are arranged periodically along the X-axis direction according to a period that matches that of the grating image in the operable image plane, as previously described. The exemplary phase mask element 561 as shown has six phase masks in each phase mask set 520 for use with six fiber optic receiver channels in a balanced configuration where diametrically opposing fiber optic receiver apertures receive the same phase of light signal modulation with x direction movement of the readhead relative to the scale. The phase masks have spatial phases of 0 degrees (520A and 520Ax), 120 degrees (520B and 520Bx), and 240 degrees (520C and 520Cx). The boundary between the various phase masks 520 is easily visible under a microscope for a phase mask element constructed with grating bars 521. These can be used to align the phase mask element 561 relative to the receiver fibers. The inventor has found that alignments within tolerances less than 20 microns and even less than 10 microns are easily achievable using a microscope and an XYZ micrometer stage to position the phase mask element 561 relative to the receiver fibers.

FIGS. 6A and 6B are end and side views of a second generic embodiment of a fiber optic readhead arrangement 20a according to this invention. The fiber optic readhead arrangement 20a has a number of elements in common with the generic fiber optic readhead arrangement 20 and the fiber optic readhead 60a described above. Due to the similarities in configuration and operation, detailed explanation is not given below for certain aspects of the fiber optic readhead arrangement 20a that function similarly to the previously described similar elements.

In the exemplary embodiment shown in FIGS. 6A and 6B, the fiber optic readhead assembly 20a includes a first ferrule 740 that encloses the receiver optical fibers 730 and is located approximately concentrically in a ferule-like assembly housing 765. A transparent substrate 765 carrying phase masks 720 is attached to one end of the ferrule 40. Source fibers 770 are generally arranged around the outside of the ferrule 740 in through-holes located in the assembly housing 765. A source lens 778 is located in or on the assembly housing 765 in front of the end of each source fiber 770. In various exemplary embodiments, the source fibers 770 may be replaced by miniature electronic source elements such as LED's or the like, positioned proximate to the end of the assembly housing 765. In any case, it should be appreciated that the configuration of the fiber optic readhead arrangement 20a eliminates the need for the functions provided by the axicon lens and the various optical baffles in the previously described fiber optic readhead arrangement 20, and the fiber optic readhead arrangement 20a need not include such elements.

The fiber optic readhead assembly 20a also includes a second ferrule 741 that encloses an aperture plate 772 and an imaging lens 776, and is located approximately concentrically in the assembly housing 765 and abuts the transparent substrate 765. The ferrule 741 includes a telecentric optical arrangement similar to that previously described for the fiber optic readhead arrangement 20. As illustrated in FIG. 6A, the imaging lens 776 is positioned in the ferrule 741 at an image distance $d_i$ from the phase masks 720 and the receiving plane 760. The telecentric arrangement is provided by locating a limiting aperture 775 of the aperture plate 772 at the nominal focal distance f of the imaging lens 776 from the effective position of the imaging lens 776 along the optical axis 763. In operation, the fiber optic readhead assembly 20a and the scale grating 90 are arranged such that an object distance $d_o$ exists between the effective position of the imaging lens 776 and the scale 90 along the optical axis 763. These distances have similar designations to those described above with respect to FIG. 2, and the discussions of magnification relating to EQUATIONS 1 and 2 are similarly applicable to the fiber optic readhead assembly 20a.

As shown in FIGS. 6A and 6B, one primary difference of the fiber optic readhead arrangement 20a compared to the readhead arrangement 20 is that the scale illumination is provided by a plurality of source fibers 770 that are located near the perimeter of the arrangement. As best illustrated in FIG. 6B, six source fibers 770a–770c and 770ax–770cx are utilized to provide the illumination light for the fiber optic readhead arrangement 20a. The center fiber 731, which in the previous embodiments was a source fiber, is now instead a dummy fiber that is utilized primarily for providing proper assembly spacing for the six outer receiver fibers 730 of the readhead 760. In various exemplary embodiments, the source fibers 770 are single mode fibers and are smaller than the receiver fibers 730, which makes the optical fiber bundle of the fiber optic readhead arrangement 20a relatively more compact and flexible. In various exemplary embodiments, for a chosen type of source fibers 770, the source fibers 770 are chosen to have a NA that is as large as can be practically achieved for that type of fiber, in order to enhance the distribution of light across the scale.

Similar to the embodiment of the fiber optic readhead 60a, the readhead 760 of the fiber optic readhead arrangement 20a includes a balanced pair configuration of three pairs of optical fiber receiver channels 790. The fiber-optic readhead arrangement 20a includes a first set of three receiver fibers 730a–730c, and a second set of three respective receiver fibers 730ax to 730cx, that are respectively arranged in "balanced pairs" on opposite sides of an expected illumination field center. Thus, in the exemplary embodiment shown in FIGS. 6A and 6B the three pairs of optical fiber receiver channels 790, including the receiver fibers 730, the phase masks 720, and the receiver apertures 710 (provided by core regions at the receiving end of the receiver fibers 730), may be fabricated, assembled, and operated as previously described for the fiber optic readhead 60a with reference to FIGS. 5A and 5B. It will be appreciated that in the illustration of FIG. 6A, the ends of the receiver optical fibers 730 are illustrated as being slightly removed from the surface of the transparent substrate 765 so as to better illustrate the transmission of light to the optical fibers. However, in various exemplary embodiments, the ends of the receiver optical fibers 730 abut, or nearly abut, the transparent substrate 765.

As illustrated in FIG. 6A, the source fibers 770 emit a source fiber light 750 that is provided from a remote light source for the fiber optic readhead arrangement 20a. Immediately adjacent to the output end of the source fibers 770, the source fiber light 750 generally diverges at a divergence half-angle that is determined by the effective numerical aperture of the source fiber 770. In various exemplary embodiments, the divergence half-angle is on the order of approximately 2–10 degrees. Each respective source fiber light 750 passes through a source lens 778. The source lens 778 is designed and positioned according to known optical design practices to deflect each respective source fiber light 750 such that the source lens 778 emits respective converging spokes of source light 752 that mutually converge to provide corresponding regions of illumination that are arranged to overlap and generally illuminate an approximately annular or circular region at the surface of the scale 90. In any case, the source lens 778 generally concentrates the light in the area(s) of the scale 90 that will be imaged back through the imaging lens 776 to the area(s) of the phase masks 720 of the fiber optic receiver channels 790, to provide the best practical illumination intensity at the receiving plane 760 for a given source light power. The areas of the scale 90 that will be imaged back through the imaging lens 776 to the fiber optic detector channels 790 are included in an imaged region 764 that generally surrounds and includes an optical axis 763 of the fiber optic readhead arrangement 20a. The nominal limits of the converging spokes of source light 752 are illustrated in coarsely dashed outline for the exemplary embodiment shown in FIG. 2. The converging spokes of source light 752 illuminate the scale grating pattern of the scale 90 to give rise to a scale light 753.

In one alternative embodiment, a diffuser layer, such as a textured surface or a diffusing material layer may be included on the annular source lens 78. Such a diffuser layer causes localized diffusion in the various portions of the beam passing through the annular source lens to provide more uniform illumination at the surface of the scale 90.

As described above, the fiber optic readhead arrangement 20a includes a telecentric optical arrangement provided by locating the limiting aperture 775 at the nominal focal distance f of the imaging lens 776 from the effective position of the imaging lens 776 along the optical axis 763. In this position at the back focal point of the imaging lens 776, the limiting aperture acts as a spatial filter to block all light rays that are not approximately parallel to the optical axis 763 when entering the imaging lens 776. The radially-outermost rays of the imaged region 764 that are both parallel to the optical axis 763 and within the effective entrance pupil of the imaging lens 776 are shown in finely dashed outline for the exemplary embodiment shown in FIG. 6A. Thus, the illustrated portion of the reflected scale light 753 which travels parallel to the optical axis 763 passes through the imaging lens 776 and is focused to emerge as converging scale light 754. The converging scale light 754 passes through the limiting aperture 775 in the aperture plate 772 and emerges as diverging scale light 755. The limiting aperture 775 is located at the nominal focal length f of the imaging lens 776 from the effective plane of the imaging lens 776, making the magnification of the image of the scale 90 at the receiving plane 760 approximately independent of the object distance $d_o$, as outlined above. The diverging scale light 755 forms an operably focused, or approximately focused, image of the scale grating pattern of the scale 90 at the receiving plane 760 of the readhead arrangement 20a. Various applicable considerations related to image focus have been discussed above.

The respective phase masks 720 of the readhead arrangement 20a are similar to the respective phase masks 520 described above with respect to the fiber optic readhead 60a and receive and spatially filter the image produced by the diverging scale light 775 at the receiving plane 760 to provide respective optical signal lights. The corresponding optical output signals are output along the receiver optical fibers 730a–730c and 730ax–730cx.

In various exemplary embodiments, the source lens 778 may be formed of a single annular component, such as that illustrated for the annular source lens 78 of FIG. 1. In various other exemplary embodiments, a respective compact source lens 778 may be placed in front of each of the source fibers 770. In yet other exemplary embodiments, the group of source fibers 770 are configured to provide adequate illumination in the imaged region 764 without the use of a source lens 778, and the source lens 778 is omitted in such embodiments.

Figure 7:
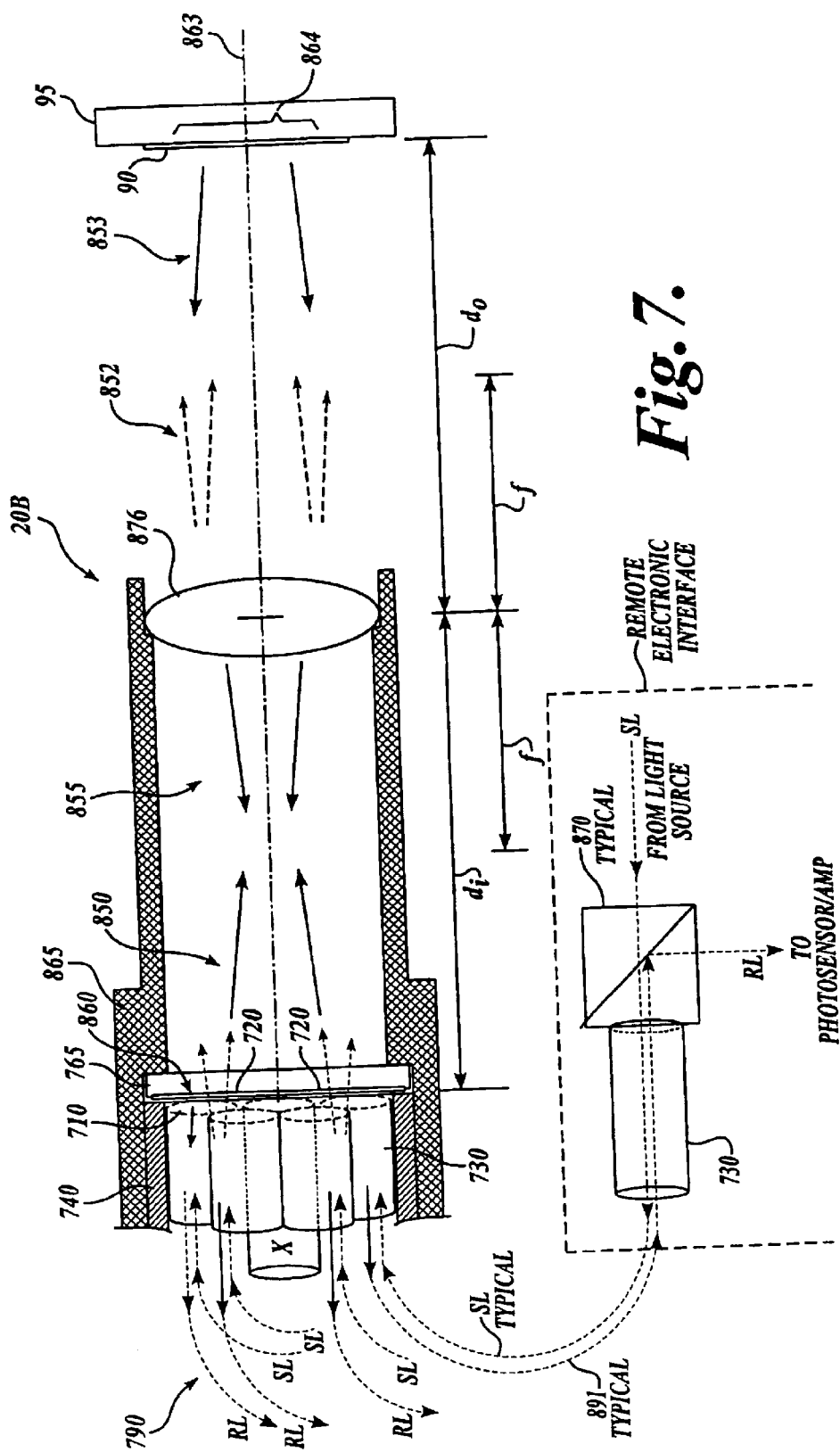
FIG. 7 is a side view of a third generic embodiment of a fiber optic readhead arrangement according to this invention.

FIG. 7 shows a third exemplary embodiment of a fiber optic readhead arrangement 20b according to this invention. The fiber optic readhead arrangement 20b has a number of components in common with the fiber optic readhead arrangement 20a described previously, and similar elements are similarly numbered. Due to the similarities in configuration and operation, only certain aspects of the fiber optic readhead arrangement 20b that require additional explanation are described in detail below.

In the exemplary embodiment shown in FIG. 7, the fiber optic readhead assembly 20b includes a first ferrule 740, receiver optical fibers 730 and a transparent substrate 765 carrying phase masks 720, all as constructed and operated as previously described for the fiber optic readhead assembly 20a. Thus, in the exemplary embodiment shown in FIG. 7 three pairs of optical fiber receiver channels 790, including the receiver fibers 730, the phase masks 720, and the receiver apertures 710 (provided by core regions at the receiving end of the receiver fibers 730), may be fabricated, assembled, and operated as previously described for the fiber optic readhead arrangement 20a. The first ferrule 740 and its enclosed and/or attached elements are located approximately concentrically in a ferrule-like assembly housing 865. The assembly housing 865 also holds an imaging lens 876 at a desired spacing along an optical axis 863 relative to a receiving plane 860 of fiber optic receiving channels 790, as described in greater detail below.

As shown in FIG. 7, one primary difference of the fiber optic readhead arrangement 20b compared to the readhead arrangements 20 and 20a is that the scale illumination is provided as a secondary function of the previously described receiver optical fibers 730. No separate source fibers are required.

In the exemplary embodiment shown in FIG. 7, in a remote electronic interface unit, for example a unit similar to the previously described remote electronic interface unit 405, each of the receiver optical fibers 730 is interfaced to a respective beam splitter 870. In addition, each respective beam splitter 870 is interfaced to a remote light source that provides a source light SL through the beamsplitter and into the respective receiver optical fiber 730, as shown schematically in FIG. 7. Furthermore, each respective beam splitter 870 is interfaced to a respective remote photosensor/amp that receives the respective optical signal 891 carried by that respective receiver optical fiber 730 after it is deflected through the beamsplitter, as respective received light RL, as shown schematically in FIG. 7. It will be appreciated that a beam splitter 870 operates such that approximately 50% of the light from a remote light source passes through the beam splitter 870 into the respective receiver optical fibers 730, and approximately 50% of the light of an optical signal 891 passes through the beam splitter 870 into the respective photosensor/amp.

In various other exemplary embodiments, in the remote electronic interface unit, the respective receiver optical fibers 730, the remote light source and the respective photosensor/amps are interfaced to respective optical circulators, or respective ports of a multi-port optical circulator (which is a common technology utilized in the telecommunications industry) instead of to the conventional beamsplitter 870 shown in FIG. 7. One exemplary multi-port optical circulator that is suitable for such embodiments is shown in U.S. Pat. No. 6,014,244, to Chang, which is hereby incorporated by reference in its entirety.

A further difference of the fiber optic readhead arrangement 20b compared to the readhead arrangements 20 and 20a is that the fiber optic readhead arrangement 20b does not include a telecentric optical arrangement or the associated aperture elements. As illustrated in FIG. 7, the receiver fibers 730 emit the source light SL as fiber source light 850. Immediately adjacent to the end of the receiver fibers 730, the fiber source light 850 generally diverges at a divergence half-angle that is determined by the effective numerical aperture of the receiver fibers 730, which is sufficient to provide a satisfactory area of illumination on the scale grating 90. The fiber source light 850 passes through imaging lens 876 and is emitted from the fiber optic readhead arrangement 20b as source light 852 to generally illuminate an approximately circular region at the surface of the scale 90. The areas of the scale 90 that will be imaged back through the imaging lens 876 to the fiber optic detector channels 790 are included in an imaged region 864 that generally surrounds and includes the optical axis 863 of the fiber optic readhead arrangement 20b. The illuminated region of the scale grating pattern of the scale 90 gives rise to a reflected scale light 853. The reflected scale light 853 travels through the imaging lens 876 to provide the scale image light 855, which forms an operably focused, or approximately focused, image of the scale grating pattern of the scale 90 at the receiving plane 860 of the readhead arrangement 20b. Various applicable considerations related to image focus have been discussed above.

The respective phase masks 720 of the readhead arrangement 20b are similar to the respective phase masks 720 described above with respect to the fiber optic readhead arrangement 20a and receive and spatially filter the image produced by the scale image light 855 at the receiving plane 860 to provide respective optical signal lights 891. The corresponding respective optical output signals are output along the respective receiver optical fibers 730.

In the exemplary embodiment shown in FIG. 7, the imaging lens is a biconvex lens having a nominal focal distance f as shown. The effective position of the imaging lens 876 is set at a distance $d_i$ along the optical axis 863 from the phase masks 720 and the receiving plane 860. In operation, the fiber optic readhead assembly 20b and the scale grating 90 are arranged such that an object distance $d_o$ exists between the effective position of the imaging lens 876 and the scale 90 along the optical axis 763. In the exemplary embodiment shown in FIG. 7, $d_i=d_o=2f$. These distances have similar designations to those dimensions described above with respect to FIG. 2, and the discussion of magnification relating to EQUATION 2 is applicable to the non-telecentric arrangement of the fiber optic readhead assembly 20b. Thus, for the exemplary embodiment shown in FIG. 7, the magnification is 1.

It will be appreciated that the fiber optic readhead arrangement 20b does not require a number of the components used in the other fiber optic readhead arrangements described above. More specifically, the fiber optic readhead arrangement 20b utilizes the set of receiver fibers 730 to also function as source fibers, and a separate source fiber is not used. Furthermore, the previously described axicon lens, optical baffles, aperture plate, and source lenses are not used in the fiber optic readhead arrangement 20b. The fiber optic readhead arrangement 20b is thus less complex than the previously described fiber optic readhead arrangements and can be provided in a more compact configuration. However, one of the tradeoffs is that the fiber optic readhead arrangement 20b is not a telecentric arrangement. Therefore, the magnification of the scale grating image will vary with mounting or guiding errors that cause the operating gap between the fiber optic readhead arrangement 20b and the scale grating 90 to vary from the nominal design value. This in turn will affect the accuracy of the fiber optic readhead arrangement 20b to some degree. However, the fiber optic readhead arrangement 20b will still provide several of the aforementioned benefits of a fiber optic readhead arrangement according to the principles of this invention, and particularly in applications that limit mounting or guiding errors. In particular, the fiber optic readhead arrangement 20b may be provided with a particularly small outer diameter. Due to the availability of very small diameter optical fibers, in various exemplary embodiments the smallest practically achievable lens diameter is the primary factor determining the minimum diameter of the fiber optic readhead arrangement 20b. Accordingly, the outer diameter of the fiber optic readhead arrangement 20b may easily be made less than one of 3 millimeters, 2 millimeters, and even 1 millimeter, in various exemplary embodiments.

Figure 8:
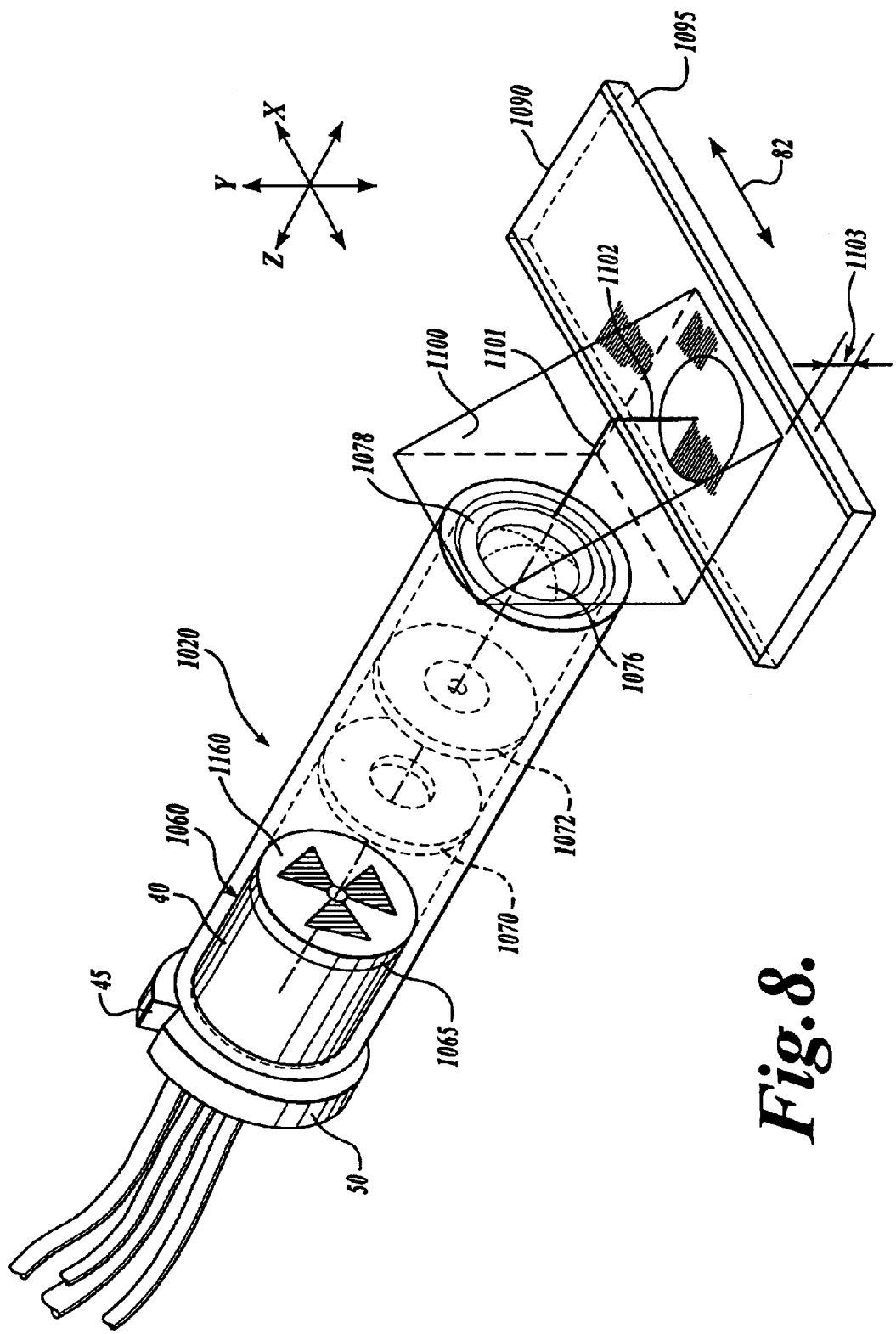
FIG. 8 shows an optical deflector useable in conjunction with various fiber optic readhead arrangements according to this invention.

FIG. 8 shows an optical deflector 1100 usable in conjunction with various fiber optic readheads according to this invention, in one exemplary orientation relative to a scale grating 1090. As shown in FIG. 8, a generic exemplary optical fiber readhead arrangement 1020 includes a readhead 1060, an optical assembly housing 1065, an optical baffle 1070, an aperture plate 1072, an imaging lens 1076 and an annular source lens 1078, similar to the components previously described with reference to FIGS. 1–3. The optical fiber readhead arrangement 1020 transmits a source light generally along a beam path 1101 to the optical deflector 1100, where it is deflected along a beam path 1102 and through an operating gap 1103 towards the scale grating 1090. Similarly, scale light reflecting, diverging and diffracting from the scale grating 1090 is returned to the optical deflector 1100 generally along the beam path 1102 and deflected back towards the readhead 1060 generally centered along the nominal beam path 1101. The scale grating 1090 moves relative to the optical fiber readhead arrangement 1020 and the deflector 1100 along the measuring axis direction 82. The returned scale light provides an image of the scale grating 1090 at an real-image plane in an illumination field that is generally centered with respect to the fiber optic receiver channel configuration of the exemplary optical fiber readhead arrangement 1020, as previously described with reference to various other exemplary embodiments according to this invention. It should be appreciated that the grating bars of the phase masks of the exemplary optical fiber readhead arrangement 1020 are oriented such that they are perpendicular to the measuring axis 82. It should also be appreciated that the more accurately the deflector 1100 deflects the beam path 1101 relative to a nominal deflection of 90 degrees to become the beam path 1102, and the more accurately the beam path 1102 is made normal to the surface of the scale grating 1090, the more accurate and robust the resulting position measurement system will be.

In various exemplary embodiments, the deflector 1100 is a reflecting right angle prism, mirror, or other suitable optical component reliably mounted on a separate member in a fixed relation relative to a fiber optic readhead according to this invention. In order to maintain a short path length operable for imaging, and still maintain a practical operating gap relative to the scale grating 1090, the deflector 1100 is preferably mounted as close as possible to the end of the optical assembly housing 1065. It should be appreciated that in various exemplary embodiments, the deflector 1100 may require an increased total imaging distance relative to a readhead configuration without a deflector. Thus, in such cases, care should be taken to adjust the various readhead design parameters to maintain design relationships according to the principles of this invention. In various exemplary embodiments, the deflector 1100 is properly aligned and attached directly to the optical assembly housing 1065.

In the embodiment shown in FIG. 8 the optical fiber readhead arrangement 1020 is oriented with its long axis transverse to the direction of the measuring axis 82 of the scale grating 1090. Either the optical assembly housing 1065 or the scale grating 1090 may be fixed in position, with the other element moveable. It will be appreciated that in numerous applications it is practical to use a deflector such as the exemplary deflector 1100 in this manner because of the ultra-miniature size of a fiber optic readhead arrangement 1020 according to this invention. It will also be appreciated that in numerous applications a deflector such as the exemplary deflector 1100 further enhances the utility of a fiber optic readhead arrangement 1020 according to this invention by allowing the optical assembly housing 1065 to be flexibly oriented relative to the scale grating 1090 and the measuring axis direction 82, such that the largest and narrowest dimensions of the readhead are oriented in desired directions. It will further be appreciated that use of a deflector such as the exemplary deflector 1100 is beneficial for orienting the route of the optical fibers and/or cables of the fiber optic readhead arrangement 1020 in desired directions.

It should be appreciated that any of the embodiments shown, described or taught herein can be adapted to provide any of the circular or cylindrical rotary position readhead arrangements as taught in the incorporated '312 application. A circular rotary embodiment may be understood by considering the segment of scale shown in FIG. 8 to carry scale grating tracks which are segments of a relatively planar rotary grating scale that rotates about an axis parallel to the y-axis. In such a case, the measuring axis 82 follows a relatively planar circular path in the X-Z plane. A cylindrical rotary embodiment may be understood by considering the segment of scale shown in FIG. 8 to carry scale grating tracks which are segments of a relatively cylindrical grating scale that rotates about an axis parallel to the z-axis. In such a case, the measuring axis 82 follows a relatively cylindrical circular path that is circular in the X-Y plane.

With regard to scale illumination, although the various exemplary embodiments disclosed above have been described as including a self-contained source of scale illumination, it should be appreciated that the scale pattern of a scale usable according to this invention may be provided with sufficient externally-supplied illumination that in various exemplary embodiments according to this invention the fiber optic readhead arrangement can passively receive enough light from the scale to produce an operable image and need not output light. Accordingly, in such embodiments, various elements associated with providing a source light may be omitted if they serve no other purpose, such as providing an assembly spacing function, or the like, as will be apparent to one of ordinary skill in the art. Accordingly, various such embodiments may have outer diameters that are reduced in comparison to the comparable previously described embodiments.

With regard to variations in various light source components in those embodiments that do provide illumination, although the source fibers in various exemplary embodiments described above have been described as single-mode fibers, suitable multi-mode source fibers may be used in a variety of the embodiments described above. More generally, any suitable fiber type may be used as a source fiber in various embodiments, provided that the particular core diameter and divergence angle associated with the a particular source fiber is chosen in conjunction with, or to be compatible with, the particular optical configuration of the associated fiber optic readhead arrangement, in order to provide the desired illumination characteristics.

Similarly, incoherent light sources, such as LEDs may be substituted for coherent light sources such as laser diodes, or vice-versa, in various exemplary embodiments according to this invention. More generally, provided that a light source such as an LED can be coupled effectively to the source (fibers) in order to provide a desired illumination intensity, and provided that a light source such as an laser diode does not give rise to speckle phenomena that render the scale pattern image unusable, these and other light sources may be used in various exemplary embodiments according to this invention. Various light sources may be tested experimentally in a fiber optic readhead arrangement according to this invention, if necessary, in order to very their suitability.

With regard to the readhead ferrule and optical assembly housing described above, although the various exemplary embodiments disclosed above have been described as including these as separate elements, such embodiments are primarily advantageous for facilitating certain assembly techniques. However, it should be appreciated that in various other embodiments other assembly techniques can be used in conjunction with fiber optic readhead arrangements where the functions of the readhead ferrule and optical assembly housing described above are provided by a different number of elements, or by a single element or assembly where the various functions of the readhead ferrule and optical assembly housing described above are merged and/or are indistinguishable.

While this invention has been described in conjunction with the exemplary embodiments outlined above, it is evident that the embodiments and design factors described above are indicative of additional alternative embodiments, modifications and variations, as will be apparent to those skilled in the art. Accordingly, the embodiments of the invention, as set forth above, are intended to be illustrative, not limiting. Various changes may be made without departing from the spirit and scope of the invention.

What is claimed is:

1. A device for measuring the relative displacement between two members, the device comprising:
   a scale having a scale grating pattern formed along a measuring axis direction; and
   a fiber optic readhead arrangement positionable to provide an operable image of the scale grating pattern, the fiber optic readhead arrangement comprising:
      a housing element;
      a lens; and
      a plurality of fiber-optic receiver channels, each respective fiber-optic receiver channel comprising:
         a respective receiver channel spatial phase mask portion having a respective spatial phase and having its light-blocking elements arranged at a pitch that is operable for spatially filtering the operable image of the scale grating pattern, the respective receiver channel spatial phase mask portion generally located at a nominal receiver plane that is operable for spatially filtering the operable image of the scale grating pattern; and
         at least one respective receiver channel optical fiber having an input end that receives a respective receiver channel optical signal light;
   wherein:
   the respective receiver channel optical signal light received by the at least one respective receiver channel optical fiber comprises optical signal light collected through the respective receiver channel spatial phase mask portion over a respective collected light area having a collected light area dimension along the measuring axis direction that is at least one full period of the respective receiver channel spatial phase mask portion;

when the readhead is operably positioned relative to the scale grating pattern at least first and second respective channels of the plurality of fiber-optic receiver channels spatially filter their respective portions of the operable image of the scale grating pattern at the nominal receiver plane to provide at least first and second respective receiver channel optical signals having at least first and second respective signal phases; and the device outputs the at least first and second respective receiver channel optical signals along respective optical fibers to provide relative displacement measurement information in the form of a plurality of respective optical output signals, the respective optical output signals produced without the use of an electronic photodetector element.

2. The device of claim 1, wherein the fiber optic readhead arrangement comprises a transparent mask substrate and each respective receiver channel spatial phase mask portion is fabricated on a surface of the transparent mask substrate with its light-blocking elements positioned along the measuring axis direction with respect to the light-blocking elements of the other receiver channel spatial phase mask portions in a manner that establishes desired relationships between the respective spatial phases of the respective receiver channel spatial phase mask portions.

3. The device of claim 2, wherein the input end of each respective receiver channel optical fiber is nominally positioned against the corresponding respective receiver channel spatial phase mask portion on the surface of the transparent mask substrate.

4. The device of claim 1, wherein:
the fiber optic readhead arrangement has an optical axis;
each fiber-optic receiver channel has a respective nominal light-carrying area corresponding to an aggregate light-carrying core area of the at least one respective receiver channel optical fiber, the respective nominal light-carrying area proximate to the input end of the at least one respective receiver channel optical fiber having a respective nominal centroid; and
at least three respective fiber-optic receiver channels of the plurality of fiber-optic receiver channels each have a respective nominal centroid that is separated from the optical axis by a nominal respective location radius that is approximately the same for each of the at least three respective fiber-optic receiver channels.

5. The device of claim 4, wherein:
a central optical fiber is positioned approximately concentrically with the optical axis, at least proximate to an end of the central optical fiber;
the central optical fiber comprises one of a) a source optical fiber that emits a respective radiation from a light-carrying core area at the end of the source optical fiber and b) a dummy fiber; and
the at least three respective fiber-optic receiver channels are positioned substantially against the central fiber at least proximate to the input ends of the respective receiver channel optical fibers and proximate to the end of the central optical fiber.

6. The device of claim 1, wherein the plurality fiber-optic receiver channels comprise at least 2N respective fiber-optic receiver channels arranged in an arrangement of N operable pairs, where N is an integer equal to at least 2, each operable pair comprising two respective fiber-optic receiver channels arranged on opposite sides of a center of the arrangement of N operable pairs, wherein the two respective spatial phase mask portions corresponding to those two respective fiber-optic receiver channels have one of a) the same spatial phase and b) spatial phases that nominally differ by 180 degrees.

7. The device of claim 1, wherein at least each collected light area and each input end are positioned entirely within a cylindrical volume having an axis perpendicular to the nominal receiver plane and having a cylinder radius that is at most 3 millimeters.

8. The device of claim 7, wherein the cylinder radius containing at least each collected light area and input end is at most 2.0 millimeters.

9. The device of claim 8, wherein the cylinder radius containing at least each collected light area and input end is at most 1.25 millimeters.

10. The device of claim 7, wherein the respective collected light area is at least partially determined by at least one of a) an aggregate light-carrying core area proximate to the input end of the corresponding at least one respective receiver channel optical fiber, b) a light receiving area of a miniature lens positioned proximate to the respective receiver channel spatial phase mask portion and proximate to the input end of the at least one respective receiver channel optical fiber and c) a limiting aperture feature of the respective receiver channel spatial phase mask portion.

11. The device of claim 1, wherein the housing element surrounds the other elements of the fiber optic readhead arrangement, the housing element has a relatively longer outer dimension in a length direction parallel to the axis of the optical fibers and relatively narrower outer dimensions in directions perpendicular to the axis of the optical fibers over at least a portion of its length, and the fiber optic readhead arrangement is constructed such that at least a portion of the length of the housing element can be inserted into a bore having a dimension perpendicular to its central axis that is at least as small as 5.0 millimeters.

12. The device of claim 11, wherein at least a portion of the length of the housing element can be inserted into a bore having a dimension perpendicular to its central axis that is at least as small as 2.5 millimeters.

13. The device of claim 12, wherein the fiber optic readhead arrangement is assembled into an orientation-maintaining connector that is mechanically interchangeable with at least one standard commercially-available polarization-maintaining optical fiber connector.

14. The device of claim 1, wherein the fiber optic readhead arrangement has an optical axis and the fiber optic readhead arrangement further comprises a limiting aperture located along the optical axis between the imaging lens and the plurality of fiber-optic receiver channels.

15. The device of claim 14, wherein the limiting aperture located along the optical axis is spaced apart from an effective plane of the imaging lens by a distance that is at least approximately the same as a focal distance of the imaging lens.

16. The device of claim 14, wherein the limiting aperture has a limiting aperture dimension such that when the readhead is operably positioned relative to the scale grating pattern the operable image of the scale grating pattern generally located at the nominal receiver plane is blurred to an extent at least partially determined by the limiting aperture dimension.

17. The device of claim 16, wherein the limiting aperture is circular and has a limiting aperture dimension that is a diameter of at least 100 microns and at most 500 microns.

18. The device of claim 17, wherein the limiting aperture is circular and has a limiting aperture dimension that is a diameter of at least 150 microns and at most 400 microns.

19. The device of claim 16, wherein when there is relative displacement between the fiber optic readhead arrangement and scale grating pattern along the measuring axis direction, each respective optical output signal comprises a sinusoidal function of the relative displacement, and each such sinusoidal function varies from an ideal sinusoidal function by at most 1/16 of the peak-to-peak variation of each such sinusoidal function.

20. The device of claim 19, wherein each such sinusoidal function varies from an ideal sinusoidal function by at most 1/32 of the peak-to-peak variation of each such sinusoidal function.

21. The device of claim 1, wherein the fiber optic readhead arrangement is located on a first side of the scale grating pattern, the scale grating pattern includes transparent elements that transmit transmitted light arising on a second side of the scale grating pattern, and the operable image arises from transmitted light that enters the imaging lens.

22. The device of claim 1, wherein the fiber optic readhead arrangement is located entirely on a first side of the scale grating pattern, the scale grating pattern includes reflective elements that are at least partially reflective and that reflect reflected light arising on the first side of the scale grating pattern, and the operable image arises from reflected light that enters the imaging lens.

23. The device of claim 22, wherein the fiber optic readhead arrangement comprises at least one respective source of light, the light is emitted from the fiber optic readhead arrangement to illuminate the scale grating pattern, and at least some of the reflected light arising on the first side of the scale grating pattern comprises reflected light that is emitted from the fiber optic readhead arrangement.

24. The device of claim 23, wherein the at least one respective source of light comprises at least one respective receiver channel optical fiber end, the light is emitted from the fiber optic readhead arrangement through the imaging lens, and the light is input at a remote end of the at least one respective receiver channel optical fiber through at least one optical device that is operable to input the light to the remote end and is further operable to receive the respective optical output signal at the remote end and output the respective optical output signal along a path to a remote photodetector.

25. The device of claim 24, wherein the at least one optical device that is operable to input the light to the remote end and is further operable to receive the respective optical output signal at the remote end comprises one of a beamsplitter and a circulator.

26. The device of claim 23, wherein the light is emitted from the fiber optic readhead arrangement at a plurality of locations included in an annular region generally surrounding the imaging lens.

27. The device of claim 26, wherein the plurality of locations are generally arranged in an arrangement that is axisymmetric with respect to an optical axis of the fiber optic readhead arrangement.

28. The device of claim 26, wherein the fiber optic readhead arrangement comprises at least one light deflecting element positioned in the annular region generally surrounding the imaging lens and each at least one light deflecting element tends to deflect the light that is emitted from the fiber optic readhead arrangement toward an optical axis of the fiber optic readhead arrangement.

29. The device of claim 26, wherein the fiber optic readhead arrangement comprises an element that at least partially diffuses the light that is emitted from the fiber optic readhead arrangement.

30. The device of claim 26, wherein the plurality of locations correspond to a plurality of respective sources of light, each respective source of light comprising one of a) an electronic solid-state light source element, at least a portion of the solid-state light source element generating the light, and b) an output end of a source optical fiber, the source optical fiber connectable to a remote light source that generates the light.

31. The device of claim 26, wherein the fiber optic readhead arrangement has an optical axis and the fiber optic readhead arrangement further comprises a limiting aperture located along the optical axis between the imaging lens and the plurality of fiber-optic receiver channels, the limiting aperture spaced apart from an effective plane of the imaging lens by a distance that is at least approximately the same as a focal distance of the imaging lens.

32. The device of claim 31, wherein the light is emitted from the fiber optic readhead arrangement in a spatially-continuous distribution around the annular region generally surrounding the imaging lens.

33. The device of claim 32, the fiber optic readhead arrangement comprising:
   an optical element positioned along the optical axis, the optical element operable to input a light beam and output a diverging annular ring of light, the optical element comprising one of a) an axicon lens and b) a diffractive optical element;
   an annular light deflecting element positioned in the annular region generally surrounding the imaging lens, the annular light deflecting element tending to deflect the light that is emitted from the fiber optic readhead arrangement toward the optical axis; and
   the at least one respective source of light comprising an output end of a source optical fiber, the source optical fiber connectable to a remote light source that generates the light, the output end of the source optical fiber located along the optical axis and proximate to the nominal receiver plane,
   wherein:
   light output from the output end of the source optical fiber is received by the optical element, the optical element outputs a diverging annular ring of light, the diverging annular ring of light follows a path that generally surrounds the limiting aperture and the imaging lens, the diverging annular ring of light enters the annular light deflecting element and is emitted from the fiber optic readhead arrangement in the spatially-continuous distribution around the annular region generally surrounding the imaging lens.

34. The device of claim 33, the fiber optic readhead arrangement comprising a first optical baffle positioned generally surrounding the diverging annular ring of light and generally surrounding a diverging scale image light between the limiting aperture and the nominal receiving plane.

35. The device of claim 34, the fiber optic readhead arrangement comprising a second optical baffle positioned generally inside the diverging annular ring of light and generally surrounding the diverging scale image light between the limiting aperture and the nominal receiving plane.

36. The device of claim 1, wherein each respective collected light area has a collected light area dimension along the measuring axis direction that is at least three full periods of the respective receiver channel spatial phase mask portion.

37. The device of claim 36, wherein each respective collected light area has a collected light area dimension along the measuring axis direction that is at least six full periods of the respective receiver channel spatial phase mask portion.

38. The device of claim 1, further comprising a reflective surface, wherein:
the fiber optic readhead arrangement has an optical axis and the reflective surface is arranged at a location along the optical axis between the imaging lens and the scale grating pattern such that the reflective surface effectively deflects the optical axis by approximately 90 degrees; and
the fiber optic readhead arrangement and reflective surface are arranged relative to the scale grating pattern such that the nominal receiver plane and the operable image of the scale grating pattern are nominally perpendicular to the plane of the scale grating pattern.

39. The device of claim 1, wherein the scale comprises one of a) a generally planar member wherein the scale grating pattern is formed along a measuring axis direction that follows a straight line on the planar member, b) a generally planar disk-like member wherein the scale grating pattern is formed along a measuring axis direction that follows a circular path on the disk-like member, c) a generally cylindrical member wherein the scale grating pattern is formed along a measuring axis direction that follows a circular path around the cylindrical member, and d) a generally linear tape-like member wherein the scale grating pattern is formed along a measuring axis direction that follows a relatively longer axis of the tape-like member.

40. The device of claim 1, wherein the fiber optic readhead arrangement is in a transmissive configuration such that the operable image arises from transmitted light.

41. A method for operating a device for measuring the relative displacement between two members, the device comprising:
a fiber optic readhead arrangement positionable to provide an operable image of a scale grating pattern, the fiber optic readhead arrangement comprising:
a housing element;
an imaging lens;
a transparent mask substrate; and
a plurality of fiber-optic receiver channels, each respective fiber-optic receiver channel comprising:
a respective receiver channel spatial phase mask portion having a respective spatial phase and having its light-blocking elements arranged at a pitch that is operable for spatially filtering the operable image of the scale grating pattern, the respective receiver channel spatial phase mask portion generally located at a nominal receiver plane that is operable for spatially filtering the operable image of the scale grating pattern; and
at least one respective receiver channel optical fiber having an input end that receives a respective receiver channel optical signal light;
wherein:
each respective receiver channel spatial phase mask portion is fabricated on a surface of the transparent mask substrate with its light-blocking elements positioned along the measuring axis direction with respect to the light-blocking elements of the other receiver channel spatial phase mask portions in a manner that establishes desired relationships between the respective spatial phases of the respective receiver channel spatial phase mask portions;

the respective receiver channel optical signal light received by the at least one respective receiver channel optical fiber comprises light arising from the scale grating pattern and collected through the respective receiver channel spatial phase mask portion over a respective collected light area having a collected light area dimension along the measuring axis direction that is at least three full periods of the respective receiver channel spatial phase mask portion; and
at least each collected light area and each input end are positioned entirely within a cylindrical volume having an axis perpendicular to the nominal receiver plane and having a cylinder radius that is at most 5 millimeters;
the method comprising:
operably positioning the fiber optic readhead arrangement relative to the scale grating pattern;
inputting light arising from the scale grating pattern through the imaging lens to produce the operable image of the scale grating pattern at the nominal receiver plane;
receiving the operable image of the scale grating pattern at the nominal receiver plane with at least first and second respective channels of the plurality of fiber-optic receiver channels and spatially filtering respective portions of the operable image of the scale grating pattern to provide at least first and second respective receiver channel optical signals having at least first and second respective signal phases; and
outputting the at least first and second respective receiver channel optical signals along respective optical fibers to provide relative displacement measurement information in the form of a plurality of respective optical output signals, the respective optical output signals arising from spatially filtered scale light without the use of an electronic photodetector element.

42. The method of claim 41, the fiber optic readhead arrangement further comprising a limiting aperture located along an optical axis between the imaging lens and the plurality of fiber-optic receiver channels, the limiting aperture spaced apart from an effective plane of the imaging lens by a distance that is at least approximately the same as a focal distance of the imaging lens, wherein inputting light arising from the scale grating pattern through the imaging lens to produce the operable image of the scale grating pattern comprises inputting light arising from the scale grating pattern through the imaging lens and through the limiting aperture to produce the operable image of the scale grating pattern at the nominal receiver plane.

43. The method of claim 41, wherein operably positioning the fiber optic readhead arrangement relative to the scale grating pattern comprises positioning the fiber optic readhead arrangement relative to the scale grating pattern such that the operable image of the scale grating pattern generally located at the nominal receiver plane is blurred to an extent such that when there is relative displacement between the fiber optic readhead arrangement and scale grating pattern along the measuring axis direction, each respective optical output signal comprises a sinusoidal function of the relative displacement, and each such sinusoidal function varies from an ideal sinusoidal function by at most $1/16$ of the peak-to-peak variation of each such sinusoidal function.

44. The method of claim 41, wherein the operably positioned fiber optic readhead arrangement is located entirely on a first side of the scale grating pattern, the scale grating pattern includes reflective elements that are at least partially reflective and that reflect reflected light arising on the first side of the scale grating pattern, and inputting light arising from the scale grating pattern through the imaging lens comprises inputting the reflected light arising on the first side of the scale grating pattern.

45. The device of claim 44, the fiber optic readhead arrangement further comprising at least one respective source of light, the method further comprising emitting light from the fiber optic readhead arrangement to illuminate the scale grating pattern such that at least some of the reflected light arising on the first side of the scale grating pattern comprises reflected light that is emitted from the fiber optic readhead arrangement.

* * * * *

UNITED STATES PATENT AND TRADEMARK OFFICE
CERTIFICATE OF CORRECTION

PATENT NO. : 6,905,258 B2
DATED : June 14, 2005
INVENTOR(S) : J.D. Tobiason et al.

It is certified that error appears in the above-identified patent and that said Letters Patent is hereby corrected as shown below:

Column 32,
Line 1, "plurality fiber-optic" should read -- plurality of fiber-optic --.

Column 34,
Line 40, "receiver plane," should read -- receiver plane; --.

Signed and Sealed this

First Day of November, 2005

JON W. DUDAS
*Director of the United States Patent and Trademark Office*